US011727493B2

(12) United States Patent
Ungricht et al.

(10) Patent No.: US 11,727,493 B2
(45) Date of Patent: Aug. 15, 2023

(54) CLASH LOSS EVENT TRIGGERING INSURANCE SYSTEM BASED UPON AN AGGREGATE EXCESS LOSS STRUCTURE AND CORRESPONDING METHOD THEREOF

(71) Applicant: Swiss Reinsurance Company Ltd., Zurich (CH)

(72) Inventors: Jerome Ungricht, Tokyo (JP); Andrea Scascighini, Brookfield, CT (US)

(73) Assignee: Swiss Reinsurance Company Ltd., Zurich (CH)

( * ) Notice: Subject to any disclaimer, the term of this patent is extended or adjusted under 35 U.S.C. 154(b) by 56 days.

(21) Appl. No.: 15/852,741

(22) Filed: Dec. 22, 2017

(65) Prior Publication Data
US 2018/0189889 A1   Jul. 5, 2018

Related U.S. Application Data

(63) Continuation of application No. PCT/EP2015/064052, filed on Jun. 23, 2015.

(51) Int. Cl.
*G06Q 40/08*    (2012.01)
*G06Q 20/10*    (2012.01)

(52) U.S. Cl.
CPC ............. *G06Q 40/08* (2013.01); *G06Q 20/10* (2013.01)

(58) Field of Classification Search
None
See application file for complete search history.

(56) References Cited

U.S. PATENT DOCUMENTS 5,704,045 A  *  12/1997  King ................... G06Q 40/00
                                                705/35
6,049,773 A  *   4/2000  McCormack ........ G06Q 40/08
                                                 705/4
(Continued)

FOREIGN PATENT DOCUMENTS

WO    WO 96/21903 A1    7/1996
WO    WO 01/65447 A1    9/2001
(Continued)

OTHER PUBLICATIONS

RMS Solutions. "Glossary of Reinsurance Terminology". Sep. 18, 2015. https://web.archive.org/web/20150918032431/http://www.rms-actuary.com/images/2005RMSWebDesign-Glos-saryofReinsuranceTerms.pdf (Year: 2015).*

(Continued)

*Primary Examiner* — Ayal I. Sharon
(74) *Attorney, Agent, or Firm* — Oblon, McClelland, Maier & Neustadt, L.L.P.

(57) ABSTRACT

Proposed is an operationally independent clash loss event triggering risk transfer system and a method for risk sharing for a variable number of risk exposure components through the provision of independent risk protection for the risk exposure components by means of a risk transfer structure implemented by circuitry, which captures risk transfers of the exposure to multiple retentions of the components that may occur when two or more of the associated risk exposure components suffer a loss from the occurrence of the same risk event. The system triggers clash loss events simultaneously impacting various layers an/or segments of the risk transfer structure. Furthermore, an event-driven switching device may be deployed for the complementary switching of two coupled, autonomously operated resource-pooling systems, where the operation of the systems remains stable (Continued)

under particularly large losses triggered by the same measurement of a risk event.

17 Claims, 7 Drawing Sheets

(56) References Cited

U.S. PATENT DOCUMENTS

| | | | | |
|---|---|---|---|---|
| 7,565,302 | B2* | 7/2009 | Best-Devereux | G06Q 40/00 705/35 |
| 7,693,731 | B1* | 4/2010 | Weber | G06Q 40/08 705/4 |
| 7,711,634 | B2* | 5/2010 | Klugman | G06Q 40/00 705/38 |
| 8,010,393 | B1* | 8/2011 | Pierce | G06Q 40/08 705/4 |
| 8,234,192 | B2* | 7/2012 | Weber | G06Q 40/08 700/32 |
| 8,280,633 | B1* | 10/2012 | Eldering | G06Q 40/08 702/3 |
| 8,468,037 | B1* | 6/2013 | Clarke | G06Q 40/08 705/4 |
| 8,694,339 | B1* | 4/2014 | Bunick | G06Q 10/0635 705/4 |
| 10,460,393 | B2* | 10/2019 | Tröhler | G06Q 10/10 |
| 2002/0103680 | A1* | 8/2002 | Newman | G06Q 30/02 705/4 |
| 2004/0186752 | A1* | 9/2004 | Kim | G06Q 40/025 705/4 |
| 2004/0186753 | A1* | 9/2004 | Kim | G06Q 40/08 705/4 |
| 2004/0230519 | A1* | 11/2004 | Parker | G06Q 20/102 705/37 |
| 2004/0236698 | A1 | 11/2004 | Sweeney | |
| 2005/0055248 | A1 | 3/2005 | Helitzer et al. | |
| 2006/0173720 | A1 | 8/2006 | Berens et al. | |
| 2006/0218019 | A1* | 9/2006 | Reis | G06Q 40/08 705/4 |
| 2007/0214023 | A1* | 9/2007 | Mathai | G01W 1/00 705/4 |
| 2007/0282641 | A1 | 12/2007 | Thomas et al. | |
| 2008/0021659 | A1* | 1/2008 | Bertogg | G06Q 40/08 702/14 |
| 2008/0052137 | A1* | 2/2008 | Ziade | G06Q 40/00 705/4 |
| 2008/0103841 | A1* | 5/2008 | Lewis | G06Q 40/04 705/4 |
| 2008/0120144 | A1* | 5/2008 | Bartell | G06Q 20/10 705/4 |
| 2008/0154652 | A1* | 6/2008 | Bresch | G06Q 30/0252 705/4 |
| 2009/0248454 | A1 | 10/2009 | Amigo et al. | |
| 2009/0307012 | A1* | 12/2009 | Delavy | G06Q 40/08 705/4 |
| 2011/0112870 | A1 | 5/2011 | Berg et al. | |
| 2011/0153368 | A1* | 6/2011 | Pierre | G06Q 10/067 705/4 |
| 2012/0066005 | A1* | 3/2012 | Stewart | G06Q 30/0282 705/4 |
| 2013/0024342 | A1* | 1/2013 | Horowitz | G06Q 40/06 705/35 |
| 2013/0035859 | A1* | 2/2013 | Guatteri | G08B 31/00 702/3 |
| 2013/0110558 | A1* | 5/2013 | Maher | G06Q 40/08 705/4 |
| 2013/0185100 | A1* | 7/2013 | Allu | G06Q 40/08 705/4 |
| 2014/0365246 | A1* | 12/2014 | Hayward | G06Q 40/08 705/4 |
| 2015/0046194 | A1* | 2/2015 | Waddell | G06Q 40/04 705/4 |
| 2015/0073834 | A1* | 3/2015 | Gurenko | G06Q 40/08 705/4 |
| 2015/0120332 | A1* | 4/2015 | Mildenhall | G06Q 40/08 705/4 |
| 2015/0356686 | A1* | 12/2015 | Cook | G06Q 40/08 705/4 |
| 2016/0042465 | A1* | 2/2016 | Ritz | G06Q 40/08 705/4 |
| 2017/0004581 | A1* | 1/2017 | Tröhler | G06Q 10/10 |
| 2018/0047109 | A1* | 2/2018 | Scascighini | G06Q 40/08 |

FOREIGN PATENT DOCUMENTS

| | | | |
|---|---|---|---|
| WO | WO 02/50750 | A2 | 6/2002 |
| WO | WO 03/034299 | A2 | 4/2003 |

OTHER PUBLICATIONS

Delaware Dept. of Insurance. "Report on Examination of Arch Reinsurance Company as of Dec. 31, 2014". https://insurance.delaware.gov/wp-content/uploads/sites/15/2016/12/ArchResinsuranceCo2014web.pdf (Year: 2014).*

Thornton, Richard. "Aspen Opinion: Man-Made Catastrophes, A Perpetual Emerging Risk." Archived on Mar. 17, 2017 on Archive.org. https://web.archive.org/web/20170317163404/https://www.aspen.co/globalassets/documents/aspen_opinion/aspen-opinion---man-made-catastrophes.pdf (Year: 2017).*

Randall Mims Insurance Consulting. "Casualty Catastrophe Cover". Downloaded on Oct. 6, 2019. www.randallmims.com/glossary/casualty-catastrophe-cover (Year: 2019).*

Kagan, Julia. "Clash Reinsurance". Investopedia.com. Aug. 21, 2018. https://www.investopedia.com/terms/c/clash-reinsurance.asp (Year: 2018).*

Clark, David. "Basics of Reinsurance Pricing: Actuarial Study Note". Revised 2014. https://www.soa.org/globalassets/assets/files/edu/edu-2014-exam-at-study-note-basics-rein.pdf (Year: 2014).*

Canelo, Emily and Bryan C. Ware, FCAS. "Evaluating Variations in Contract Terms for Casualty Clash Reinsurance Treaties". Archived on Archive.org on Dec. 12, 2003. https://web.archive.org/web/20031212091132/https://www.casact.org/pubs/forum/97spforum/97spf201.pdf (Year: 2003).*

NAMIC Directors Bootcamp 2.0. "Fundamentals of Reinsurance for Directors". May 8, 2018. https://www.namic.org/pdf/events/2018/bc/Fundamentals_of_Reinsurance_PPT_DirBoot18.pdf (Year: 2018).*

Shah, Alpesh et al. "Reserving: Making Allowance for Changes in Terms and Conditions and Other Coverage Issues". Presented at Giro 2007. Nov. 28, 2007. https://www.actuaries.org.uk/documents/reserving-making-allowance-changes-terms-and-conditions-and-other-coverage-issues (Year: 2007).*

Insurance Journal. "New Database Tracks Management Liability Claims; Finds Lawsuits Up 33%". Feb. 2, 2006. https://www.insurancejournal.com/news/national/2006/02/02/65003.htm (Year: 2006).*

American Academy of Actuaries, Committee on Property and Liability Financial Reporting. "Reinsurance Attestation Supplement 20-1: Risk Transfer Testing Practice Note". Jan. 2007. https://www.actuary.org/sites/default/files/files/publications/pc_risk_jan2007.pdf (Year: 2007).*

Munich Reinsurance America, Inc. "Re•in•sur•ance: A Basic Guide to Facultative and Treaty Reinsurance". Copyright 2010. https://www.munichre.com/site/mram-mobile/get/documents_E96160999/mram/assetpool.mr_america/PDFs/3_Publications/reinsurance_basic_guide.pdf (Year: 2010).*

Bautz, Werner. "Aggregation of Losses and Clash Covers in Liability Treaty Reinsurance". General Reinsurance AG. Oct. 6, 2014. https://piu.org.pl/public/upload/ibrowser/140610%20Seminarium%20reasekuracyjne/Werner_Bautz_Gen_Re.pdf (Year: 2014).*

"What is Clash Loss? definition of Clash Loss (Black's Law Dictionary)". Archived in Archive.org on Mar. 4, 2013. https://web.archive.org/web/20130304181148/https://thelawdictionary.org/clash-loss/ (Year: 2013).*

(56) References Cited

OTHER PUBLICATIONS

Reinsurance Association of America. "Fundamentals of Property and Casualty Reinsurance With a Glossary of Reinsurance Terms". Copyright 2007 (Year: 2007).*

Schi��er, Larry. "Clash Cover Reinsurance and Economic Catastrophe Losses". IRMI.com. Mar. 2009. https://www.irmi.com/articles/expert-commentary/clash-cover-reinsurance-and-economic-cat-losses (Year: 2009).*

H. Braun and Lo Lei Lai. "Insurance issues for energy risk". 2006 IEEE Power Engineering Society General Meeting. Date of Conf: Jun. 18-22, 2006. DOI: 10.1109/PES.2006.1709025. https://ieeexplore.ieee.org/document/1709025?source=IQplus (Year: 2006).*

International Search Report dated Jan. 14, 2016 for International Application No. PCT/EP2015/064052.

\* cited by examiner

CLASH LOSS EVENT TRIGGERING INSURANCE SYSTEM BASED UPON AN AGGREGATE EXCESS LOSS STRUCTURE AND CORRESPONDING METHOD THEREOF

CROSS-REFERENCE TO RELATED APPLICATIONS

The present application is a continuation of International Application No. PCT/EP2015/064052, filed on Jun. 23, 2015, the entire contents of which is incorporated herein by reference.

FIELD OF THE INVENTION

The present invention relates to automated insurance systems, in particular coupling-systems for switching insurance systems through automation, for risk sharing for a variable number of risk exposure components through the provision of operationally independent, self-sufficient risk protection for the risk exposure components, by means of a risk transfer structure, which captures risk transfers of the exposure of the components to multiple retentions that may occur when two or more of the associated risk exposure components suffer a loss by way of the occurrence of the same risk event (clash loss event). The automated switching captures the covers of the additional retentions. In clash loss disaster scenarios, various layers of the risk transfer structure, i.e. lines of risk covers, are simultaneously impacted by the loss. In particular, the invention relates to an event-driven switching device for the complementary switching of two coupled, autonomously operated resource-pooling systems, where the operation of the systems should be stable under particularly large losses triggered by the same measurement of a risk event.

BACKGROUND OF THE INVENTION

Risks, in particular operational risks of risk-exposed units, entities or other operational elements can be defined as the risk of loss resulting from risk exposure caused by external risks such as the occurrence of natural catastrophes (e.g. earthquake, storm, flood, hurricane etc.) or fire etc., or internal risk, such as risk resulting from systems operation, processes, or people. Risks, as used here, can also include legal risk (including fines, penalties, punitive damages resulting from supervisory actions and private settlements) but typically excludes strategic and reputational risk. Operational risk events can be divided into different categories: 1) internal fraud; 2) external fraud; 3) employment practices and workplace safety; 4) clients, products and business practices; 5) damage to physical assets; 6) business interruption and system failures; and 7) execution, delivery & process management. Traditionally, risk-exposed components assessed their operational risk in each category separately and calculate the retention level or capital reserve needed to cover any operational risk. Risks requiring an overly high retention level are typically transferred to risk transfer units, as automated insurance systems. If such risk transfer units are used to balance the operational risk of a system or entity, the different categories of risks, as mentioned above, are also referred as lines of risk transfer or lines of insurance.

If the risk of a loss resulting from the occurrence of a specific risk event is transferred to a risk transfer system, the loss results in a claim of the risk-exposed component to the insurance system. In the classic prior art systems, an insured event triggers a single claim by a risk-exposed component, e.g. a policyholder. If, for example, a worker gets injured on the job, a workers compensation claim is the consequence to the associated risk transfer system or insurance system. However, the injury typically triggers only one claim to be covered by the insurance system, since the loss and the resulting claim normally are not related to other claims captured by the insurance system. Assuming the workers compensation insurer further transfers pooled risks to a second insurance system or reinsurance system for the type and quantum of claim made by the injured worker, the reinsurance system will reimburse the workers compensation insurer for some or all of its payment to the injured worker.

However, sometimes an insured event is catastrophic and triggers numerous substantially similar claims against multiple risk-exposed components all involving risks transferred to the same insurance system. E.g. a hurricane in South Florida that damages several factories and causes injuries to thousands of workers, triggering claims that are presented by the risk-exposed components to the same insurance system. These accumulated losses may cause an operational problem to the insurance system and/or the reinsurance system when they must be covered synchronously and even may lead to operation break-down for those systems.

Another problem occurs, when the risk transferred from the insurance system to the reinsurance system has an aggregate cap limiting the number or amount of loss/claims that may be transferred to the reinsurance system. This means that if there are numerous losses to be covered by the reinsurance system, the reinsurance system reaches its aggregate cap and the insurance system is left "bare" as regards the remaining similar claims, risks which are not transferred to a reinsurance system. These operational restrictions may present problems in the context of certain catastrophic events if an insurance system has suffered an over-accumulation of losses arising from its associated risk-exposed components. To protect the operation of an insurance system from this type of exposure from pooled risks, insurance systems may be associated with additional risk transfer structures in the form of so called clash coverage risk transfer.

Technically, every type of automated risk transfer has been used for a long time in the prior art as a technical tool to manage the risk of uncertain losses, in particular to keep up operation of functional, technical or business units. These days, significant risk exposure is associated with many aspects in the life and non-life sectors. Risk-exposed units, such as any kind of objects, individuals, corporate bodies and/or legal entities, are necessarily faced with many forms of active and passive risk management to hedge and protect against the risk of certain losses and events. The prior art addresses such risk of loss, for example, based upon the transfer and pooling of the risk of loss from a plurality of risk-exposed entities to a dedicated pooling entity. In essence, this can be executed by effectively allocating the risk of loss to this pooling unit or entity in that resources of associated units, which are exposed to a certain risk, are pooled. If one of the units is hit by an event that is linked to a transferred risk, the pooling entity directly intercepts the loss or damage caused by the event by transferring resources from the pooled resources to the affected unit. Pooling of resources can be achieved by exchanging predefined amounts of resources with the resource-pooling system; e.g., payments or premiums that are to be paid for the transfer of the risk. This means that predefined resource amounts are exchanged for the other unit, thereby assuming the risk of loss.

As described above, insurance systems use automated resource-pooling systems to pool the resources and risks of associated risk-exposed components. As described above, to avoid operational instabilities, often such resource pooling systems of on insurance system are coupled to one or more other resource pooling systems in order to redistribute parts of their pooled risks. Correspondingly, a loss that is to be covered can be segmented by those coupled insurance systems, wherein for switching from one insurance system to another insurance system, an optimal risk transfer structure has to be provided by the systems. The issue of providing optimal reinsurance solutions is a classical problem of insurance systems, since the appropriate use of coupled secondary resource pooling systems, as, e.g., reinsurance systems, is often an effective risk management tool for managing and mitigating the exposure to risk of a primary system and for guaranteeing operational stability and operational best mode practices for a minimal pooling of necessary resources. However, the related effectiveness depends on the choice of the most appropriately optimized risk transfer structure. Typically, the technical problem of optimally coupling insurance systems can be defined as an issue of optimization; meaning the goal is that of minimizing the total risk exposure of an insurance system under different boundary criteria, such as, e.g., criteria of value at risk or conditional value at risk, i.e. by finding the optimal balance between the benefit (reducing the risk by purchasing reinsurance shares) and the cost (premiums) of the redistributed insurance risk shares. Therefore, the object of the present invention addresses the technical problem of coupling two resource pooling systems with the goal of pooling the risk exposure of associated components and in seeking better and more effective technical implementations on the basis of an appropriate risk transfer structure.

For optimization, one of the problems to be considered is the problem of the multiple occurrence of related risk corrupting the normal operation of the risk pooling insurance systems and/or associated second insurance systems or reinsurance systems. In the prior art, clash coverage structures are a type of risk transfer structure designed to protect the operation of an insurance system from the loss of its normal risk transfer recoveries to reinsurance systems, when it is faced with multiple claims from multiple risk-exposed components arising from the same risk event or catastrophe and where assigned risk transfer reinsurance systems do not fully cover the insurance system for these related losses. In some instances, multiple risk-exposed units claim based upon substantially similar risk transfers to an insurance system. In other cases, a single risk-exposed component is hit by multiple losses based upon different kinds of risk transfers to the insurance system. Clash coverage structures are aimed at protecting the first insurance system burdened by these multiple claims arising from truly exceptional events, beyond those contemplated by basic primary and excess-of-loss risk transfer.

Pursuant to the condition that a clash coverage structure protects the first insurance system from multiple claims arising from the occurrence of a single event, i.e. being mappable to the same event, the definition of "clash event" is critical in the reinsurance contract. In the prior art, the core definition often has three main technical components. First, there must be loss arising from multiple risk transfers transferred from one risk-exposed component or similar losses by multiple risk transfer components. Second, all the damage must be traceable by means of the system to a particular event. And third, the clash coverage structure requires that the event take place in its entirety within a specific timeframe with measurable and definable measuring parameters. However, it has to be noted that there are ways of removing or dilute the later condition, e.g. by an originating cause language. Thus, clash events are not necessarily confined in place and time, but a broader aggregation can be provided via originating cause language.

In the prior art, clash coverage structures mainly have been applied in the context of major natural disasters, such as hurricanes, floods, fires, or earthquakes. But risk transfer technology continues to explore the application of clash coverage structures to "business disasters" like the savings and loan crisis, the collapse of Enron, the subprime crisis, and the stock option grant cases, all of which resulted in many businesses filing losses and claims to their associated insurance systems. With the advent of additional economic disasters such as the Madoff "Ponzi" scheme and its progeny, insurance systems that have been able to transfer risks by means of clash cover structures to second insurance systems with broad terms and conditions, may find that the risk transfer will corrupt their operation as the losses from such economic disasters need to be captured.

The prior art specifies a plurality of systems addressing the above-mentioned problem. For example, US 2004/0236698 A1 describes a system for automated risk management trade between two coupled systems; in particular, an insurance and a reinsurance system. This system provides for the direct transfer of premiums and loss payments between the risk-pooling systems. Further, the system allows for interactions between the two coupled systems, which allows for decision-making functions concerning reinsurance products. However, US 2004/0236698 A1 does not describe the triggering and capture of clash loss risks, and does not show how such clash loss events can be covered by automated risk transfer without endangering the independent operation of the system. Another example of the known prior art in the field of automated risk transfer systems is US 2011/0112870 A1. US 2011/0112870 A1 discloses a system for determining a percentage for assigning, i.e., transfer-related risk in an insurance pool, wherein the transferred risks are shared via a secondary resource pooling system that is based upon predefined transfer-specific conditions of a reinsurance contract. The system mainly allows for automatically providing information as to losses, which is transferred to the captive resource pooling system in the systems of the insurer and reinsurer. However, US 2011/0112870 A1 does not disclose a general method for determining the amount of the actual risk transfer. Still another example of a it) prior art patent in the field of optimal risk transfer strategies is U.S. Pat. No. 7,970,682 B1. U.S. Pat. No. 7,970,682 B1 discloses a system that automatically provides a risk transfer structure for primary resource pooling systems for the purpose of accommodating the long-standing exposure of liabilities, for achieving significant risk transfer to a third party (reinsurer), for reducing potential financial reporting inconsistencies between hedge assets and liabilities, for less operational risk, and finally for having less exposure to rollover risk (due to changes in the cost of hedging instruments); i.e., in effect, tools for assuring the operational stability of the primary resource pooling system. U.S. Pat. No. 7,970,682 B1 is not able to cover clash loss events impacting the pooled risk of a primary resource and risk pooling system; whereas, U.S. Pat. No. 7,970,682 B1 is another example for an optimization of the risk strategies of the primary insurance systems. In summary, nothing in the prior art provides a system for automated, independent triggering, capturing and covering of related loss events by the impact of one extraordinary risk event, i.e. a clash loss event.

SUMMARY OF THE INVENTION

One object of the present invention is to provide a system and method for sharing the risk of risk events of a variable number of risk-exposure components by providing dynamic, independent risk protection for the risk-exposure components; this is achieved by means of a primary resource-pooling system, which is stabilized and optimized by an appropriate partial risk transfer to at least one secondary resource and risk pooling system using an optimized risk transfer structure. In particular, the system provides an automated switching mechanism between the two coupled systems and offers a measure for the optimization of the systems. A further object of the invention seeks to provide a way to technically capture, handle and automate complex, related risk transfer structures and switching operations between the two resource pooling systems capable of capturing risk transfer of risk events triggering multiple retentions for risk-exposed components when a plurality of the associated risk-exposed components suffer a loss due to the occurrence of the same risk event, without losing the stability of operation of the system. Another object of the invention seeks to synchronize and adjust such operations based upon technical means. In contrast with standard systems, operation of the system with the associated resource-pooling systems shall create a reproducible operation with the desired, technology-based, repetitive accuracy that relies on technical means, process flow and process control/operation.

According to the present invention, these objects are achieved, in particular, with the features of the independent claims. In addition, further advantageous embodiments can be derived from the dependent claims and the related descriptions.

According to the present invention, the above-mentioned objects for complementary switching of two coupled, autonomously operated insurance systems that are provided for the purpose of independent risk protection of a variable number of risk exposure components are achieved, in particular, in that a risk transfer system is envisioned in the case of clash loss events so as to provide independent risk protection of a variable number of risk exposure components by means of two complementary coupled insurance systems in case of a plurality of loss events being triggered by one single risk event, wherein the risk-exposure components are connected to a first resource-pooling system of the first insurance system by means of a plurality of first payment-transfer modules configured for receiving and storing payments from the risk-exposure components for the pooling of their risks of losses as a consequence of the occurrence of defined risk events, wherein the first resource-pooling system is connected to a second resource-pooling system of the second insurance system by means of a second payment-transfer module configured for receiving and storing payments from the resource-pooling system of the first insurance system for the transfer of risks of the pooled risks of the first insurance system to the second insurance system, and wherein for covering losses associated with risks transferred to the insurance systems the automated resource-pooling systems are coupled, steered and operated by means of an event-triggered switching device of the clash loss event triggered risk transfer system, in that measuring devices associated with the risk exposure components measure risk-related component data of the occurrence of risk events and transfer measured risk-related component data upon occurrence to the first insurance system, wherein the risk-related component data are filtered for loss parameters of loss events as a consequence of the occurrence of one of the defined risk events by means of a filtering module based upon filtering parameters, in that the measured risk-related component data associated with different loss events are scanned for a pattern that traces measurements of two different loss events to the same risk event based at least upon time and location parameters indicating a biunique relation to a single occurrence of a risk event by means of risk event triggers, and in that in the event of a match, a corresponding link is created by means of the risk event triggers linking the two loss events, in that the linkage of two or more loss events to the occurrence of the same risk event triggers the generation of a single unique identifier, wherein the system associates each loss event linked to the occurrence of the same risk event with the same single unique identifier, and wherein a single unique identifier is set by means of an unique discrete alphanumeric string and stored in association with the corresponding loss event, in that the loss events are transferred to the second insurance system, wherein the association of the single unique identifier is verified to be in compliance with a loss reporting system of the second insurance system by means of a core engine, in that for each risk event losses of linked loss events are aggregated by means of the core engine incrementing an aggregation parameter associated with each single unique identifier and captured by the second insurance system, wherein the aggregation is triggered by the date of the first recording of the specific single unique identifier in the loss reporting system of the second insurance system, and in that in the event of detection of the aggregation parameter exceeding a predefined aggregate excess of loss threshold, an activation signal is generated by means of the switching device based upon the overage of the aggregation parameter, wherein the switching device triggers the complementary activation of the first and second resource-pooling system by means of the generated activation signal by transferring the activation to the first and/or second resource pooling system to provide risk protection to the risk exposure components, and wherein the activation of the first and/or second resource pooling system is based upon a definable risk transfer structure comprising covered segments with scopes of covered risk lines and regions providing corresponding threshold values for the complementary switching and activation. A risk event and associated loss events can e.g. only be captured by the system, if the measured risk-related component data indicate the occurrence of a sudden and accidental event directly interconnected in both time and location and/or indicate an originating cause, by means of the related time parameters and related location parameters based upon the first filtering parameters. As variant, a risk event and associated loss events are only captured by the clash loss system, if the measured risk-related component data indicate the occurrence of a sudden and accidental event directly interconnected in both time and location and/or indicate an originating cause, by means of the related time parameters and related location parameters based upon the first filtering parameters. However, the invention can be realized in two different forms: 1) legal definition (S&A event and/or Originating cause) AND claims reporting procedure or 2) claims reporting procedure ONLY, without a legal definition. Both forms are covered by the inventive structure of the present system. Thus, the inventions allows for broader linkage, not only when time and place are close (S&A event language vs. originating cause) and doesn't rely on a legal definition at all in case of form 2).

Further, the assigned single unique identifier can be implemented as a discrete alphanumeric string identifying one or more loss events as a result of one specific risk event and being different from any policy numbers defining the risk transfer between the risk-exposed components and the first insurance system. The core engine can comprise event-driven triggers for the triggering, in a data flow pathway, of measuring devices associated with the risk-exposure components for the occurrence of a risk event, and wherein, in case of a triggering of an occurrence of a risk event in the data flow pathway, corresponding loss events are assigned to the same single unique identifier. The invention has, inter alia, the advantage that the system provides the technical means for optimizing the coupling and switching of coupled resource pooling systems, thereby providing an effective risk protection of risk-exposed components in the event of the occurrence of related loss events, i.e. clash loss events. In particular, the system provides additional coverage to the insurance company in the event that one occurrence of a risk event results in two or more loss events, i.e. claims from risk-exposed components to the system, to which the risk was transferred. The system allows for the increase of the operational stability of automated first insurance systems, their integrity and security. It reduces the potential maximum loss on the occurrence of a single risk event impacting a large number of risks transferred to the first insurance system. Thus, the present invention allows for extending the coverage from normal coupled resource pooling systems to cases, where the first insurance system is faced with two or more claims from multiple insured parties, i.e. risk-exposed components, following for example a catastrophic event, such as a hurricane, flood, fire or earthquake. Therefore, the present system allows for the protection of first insurance systems when multiple claims arise from extraordinary events and technically allows first insurance systems to transfer large risks and stabilize their operation.

In one embodiment, the generation of the single unique identifier with associated aggregation parameter is also applied to loss events without linkage of other loss events to the same risk event. Such an embodiment offers, inter alia, the advantage that the system allows for the provision of additional coverage to the insurance system in the event that e.g. one casualty loss event results in two or more claims from the risk-exposed components, e.g. insured policy holders. The additional cover allows for the reduction of the potential maximum loss on both, either on a single risk or on a large number of risks.

In another embodiment, the measurements of the parameters of two different loss events which are traceable to the same risk event based upon the measurement of related time parameters and related location parameters, which are detected in the risk-related component data based upon the first filtering parameters, indicating a biunique association to a single occurrence of a risk event, the corresponding link linking the two loss events is then only created, if the contributing risk transfer layers are within defined, segments that are covered, and wherein a segment is defined by the measured classification of geographic region and line of business. This embodiment has, inter alia, the advantage that the triggering clash events necessarily give rise to loss events in different segments of the pooled and transferred risk, thereby allowing a better classification and detection of clearer defined clash event.

In still another embodiment, the assembly module of the switching device comprises means for processing risk-related component data and for providing data as to the likelihood of said risk exposure for one or a plurality of the pooled risk exposure components, in particular, based upon risk-related component data, and wherein the receipt and preconditioned storage of payments from risk exposure components for the pooling of their risks can be dynamically determined based upon the total risk and/or the likelihood of risk exposure of the pooled risk exposure components. This embodiment has, inter alia, the advantage that the operation of the first and/or second resource-pooling system can be dynamically adjusted to changing conditions in relation to the pooled risk, as, for example, a change of the environmental conditions or risk distribution, or the like, of the pooled risk components. A further advantage is that the system does not require any manual adjustments, when it is operated in different environments, places or countries, because the size of the payments of the risk exposure components is directly related to the total pooled risk.

In one embodiment, the assembly module of the switching device comprises means for processing risk-related component data and for providing information as to the likelihood of said risk exposure for one or a plurality of the pooled risk exposure components, in particular, based upon risk-related component data, and wherein the receipt and preconditioned storage of payments from the first resource pooling system to the second resource pooling system for the transfer of its risk can be dynamically determined based upon the total risk and/or the likelihood of risk exposure of the pooled risk exposure components. This embodiment has, inter alia, the advantage that the operation of the first and/or second resource-pooling system can be dynamically adjusted to changing conditions of the pooled risk, as, for example, changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one embodiment, the number of pooled risk exposure components is dynamically adjusted by means of the first resource-pooling system to a range where non-covariant, occurring risks covered by the resource-pooling system affect only a relatively small proportion of the total pooled risk exposure components at any given time. Analogously, the second resource pooling system can, e.g., dynamically adjust the number of pooled risk shares transferred from the first resource pooling systems to a range where non-covariant, occurring risks covered by the second resource-pooling system affect only a relatively small proportion of the total pooled risk transfers from the first resource pooling systems at any given time. This embodiment has, inter alia, the advantage that the operational and financial stability of the system can be improved.

In one embodiment, the risk event triggers are dynamically adjusted by means of an operating module based upon time-correlated incidence data for one or a plurality of risk events. This embodiment has, inter alia, the advantage that improvements in capturing risk events or avoiding the occurrence of such events, e.g. by improved forecasting systems etc., can be dynamically captured by the system and dynamically affect the overall operation of the system based upon the total risk of the pooled risk exposure components.

In another embodiment, upon each triggering of an occurrence, where parameters indicating a risk event are measured by means of at least one risk event trigger, a total parametric payment is allocated as a result of the triggering, and wherein the total allocated payment is transferrable upon a triggering of the occurrence. The predefined total payments can, e.g., be leveled to any appropriate lump sum, such as, for example, a predefined value, or any other sum related to the total transferred risk and the amount of the periodic payments of the risk exposure component. This variant, inter alia, has the advantage that the parametric payments or the payments of predefined amounts, which, as in the case of the embodiment, may also depend on a first, second, third or a plurality of trigger levels, i.e. the different stages of triggers, and allow for an adjusted payment of the total sum that can, e.g., be dependent on the stage of the occurrence of a risk event, as triggered by the system.

In one embodiment, a periodic payment transfer from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable by means of the monitoring module. As a variant, the request for periodic payment transfer can be interrupted automatically or waived by means of the monitoring module, when the occurrence of indicators for a risk event is triggered in the data flow pathway of a risk exposure component. These embodiments have, inter alia, the advantage that the system allows for further automation of the monitoring operation, especially of its operation with regard to the pooled resources.

In a further embodiment, an independent verification risk event trigger of the first and/or second resource pooling system is activated in cases when the occurrence of indicators for a risk event is triggered in the data flow pathway of a risk exposure component by means of the risk event triggers, and wherein the independent verification risk event trigger, additionally, issues a trigger in the event of the occurrence of indicators regarding risk events in an alternative data flow pathway with independent measuring parameters from the primary data flow pathway in order to verify the occurrence of the risk event at the risk exposure component. In this embodiment, the transfer of payments is only assigned to the corresponding risk exposure component, if the occurrence of the risk event at the risk exposure component is verified by the independent verification risk event trigger. These embodiments have, inter alia, the advantage that the operational and financial stability of the system can thus be improved. In addition, the system is rendered less vulnerable as regards fraud and counterfeit.

In a embodiment, a system is provided for adaptive operation of an autonomously operated risk-transfer system through the provision of independent risk protection of a variable number of risk exposure components by means of an automated resource-pooling system capable of pooling resources and absorbing transferred risks, wherein the risk exposure components are connected to the resource-pooling system by means of a payment-transfer module configured for receiving and storing payments from the risk exposure components for the pooling of their risks. The risk-transfer systems can comprise or be associated with insurance systems, as e.g. primary insurance systems, or any kind of financial systems or business units capable of absorbing transferred risks. For example, the inventive system for risk-transfer can be applied to or extended to asset-based systems, as operational units of financial institutes etc. In this embodiment, a switching device comprises a table providing data structures for storing a plurality of risk transfer segments comprising an assigned segment value providing a measure for a segmented part of the pooled risk. By means of a core engine of the switching device, a payment parameter is assigned to each risk transfer segment of the table and accumulated over all risk transfer segments to a total payment sum, wherein the switching device comprises a capturing device for capturing payment transfer parameters from the risk exposure components to the payment-transfer module, and wherein, upon triggering a transfer of the total payment sum at the payment-transfer module, the risk exposure of the risk exposure component assigned to the transfer of the payment sum is transferred to the insurance system. The core engine comprises event-driven triggers for the triggering, in a data flow pathway, of measuring devices associated with the risk exposure components for the occurrence of a risk event, and wherein, in the event of a triggering of an occurrence of a risk event in the data flow pathway, the corresponding risk segment is determined within the table by means of the core engine based upon the measured actual loss. In case of the occurrence of a risk event, an activation signal is generated by means of the switching device based upon the aggregation parameter and the aggregation excess of loss threshold, wherein the switching device triggers the activation of the resource-pooling system by means of the generated activation signal by transferring the activation to the resource pooling system to provide risk protection to the risk exposure components, and wherein the activation of the resource pooling system is based upon the adaptable risk transfer function.

In addition to the system, as described above, and the corresponding method, the present invention also relates to a computer program product that includes computer program code means for controlling one or more processors of the control system in such a manner that the control system performs the proposed method; and it relates, in particular, to a computer program product that includes a computer-readable medium that contains therein the computer program code means for the processors.

BRIEF DESCRIPTION OF THE DRAWINGS

The present invention will be explained in more detail, by way of example, with reference to the drawings in which:

In FIG. 5, the part of the loss in red is self-retained by the second insurance system 12, the blue part is borne by the clash loss event covered by the second insurance system 12 and the green part is reinsured in the inuring second insurance system 12 risk cover.

DETAILED DESCRIPTION OF THE PREFERRED EMBODIMENTS

Figure 1:
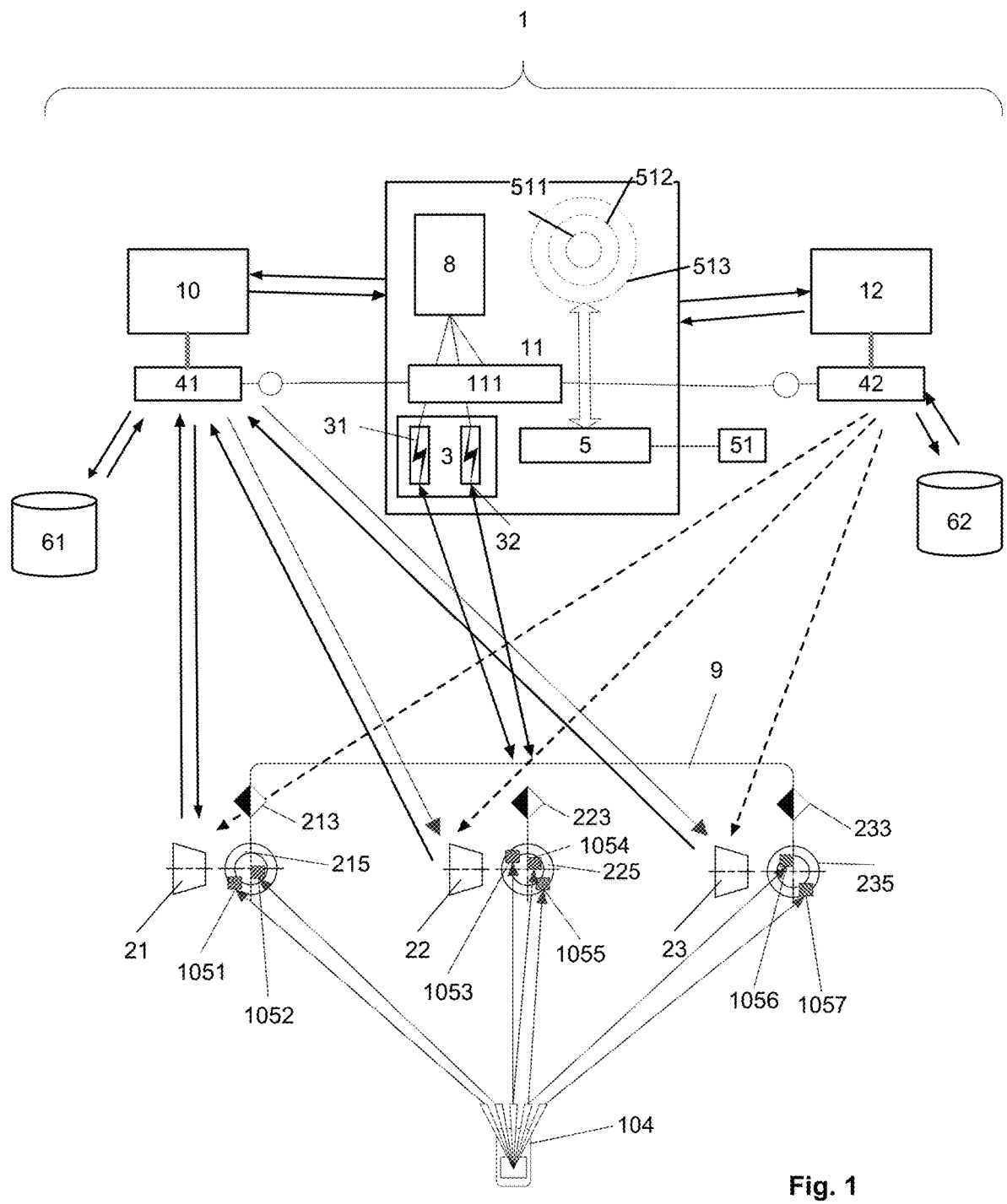
FIG. 1 shows a block diagram illustrating schematically an exemplary system 1 with an event-triggered switching device 11 for complementary switching of two coupled, autonomously operated insurance systems 10, 12 by providing an independent and self-sufficient risk protection of a variable number of risk exposure components 21, 22, 23 by means of two automated resource-pooling systems. Measured risk-related component data 211, 221, 231 associated with different loss events 1051, . . . , 1057 are scanned for pattern tracing measurements of two different loss events 1051, . . . , 1057 to the same risk event 104 by means of risk event triggers 31, 32. For each, risk event 104 losses of linked loss events 1051, . . . , 1057 are aggregated by means of the core engine 3 incrementing an aggregation parameter 34 associated with each single unique identifier 32. In the event of the detection of the aggregation parameter 34 exceeding a predefined aggregate excess of loss threshold 35, an activation signal is generated by means of the switching device 11 for complementary activation of the automated resource pooling systems.

FIG. 1 illustrates, schematically, an architecture for a possible implementation of an embodiment of the clash loss event triggered risk transfer system 1 with an event-triggered switching device 11 for complementary switching of two coupled, autonomously operated insurance systems 10, 12 by providing independent, i.e. self-sufficient operation of the system, risk protection of a variable number of risk exposure components 21, 22, 23 by means of two automated resource-pooling systems that are associated with the insurance systems 10, 12. Especially, the present system 1 is directed to capture accumulation of risks, i.e. the potential loss exposure of one event spreading to multiple lines of business and/or multiple risk exposure components 21, 22, 23 . . . captured by an first insurance system 10. Such events are called herein "clash loss events". Typically, first insurance systems 10 are exposed to four forms of accumulation risk, which are (i) Classic clash: A variety of claims follow a sudden event or occurrence, such as general liability, employer's liability, and professional indemnity claims arising from a building collapse; (ii) Serial aggregation: A defect in the design or manufacture of a product triggers multiple losses which are all linked to the initial defect; (iii) A business disaster: Multiple losses occur as the result of a single failure or the disclosure of incorrect/misleading advice/information; and (iv) Systemic failure: A repeatable process/procedure or industry/business practice results in a series of losses. In FIG. 1, reference numeral 1 refers to a system for providing optimized risk protection related to risk exposure components 21, 22, 23 . . . with the associated coupled resource-pooling systems. The resource-pooling systems, which are coupled, steered and/or operated by means of the switching device 11, provide dynamic independent risk protection and a corresponding risk protection structure for the variable number of risk exposure components 21, 22, 23; i.e., units exposed to defined risk events, wherein the occurrence of such risk events is measurable and triggerable by means of appropriate measuring devices and/or trigger modules triggering in the data flow pathway of output data; i.e., measuring parameters of the measuring devices. The system 1 includes at least one processor and associated memory modules. The system 1 can also include one or more display units and operating elements, such as a keyboard and/or graphic pointing devices, such as a computer mouse. The resource-pooling systems are technological devices comprising electronic means that can be used by service providers in the field of risk transfer or insurance technology for the purpose of risk transfer as it relates to the occurrence of measurable risk events. The invention seeks to capture, handle and automate by technological means complex related operations of the automated insurance systems, in particular in an effort of optimizing the interaction of coupled systems, and to reduce the operational requirements. Another aspect that is addressed is finding ways to synchronize and adjust such operations related to coupling or switching of resource pooling systems, which are aimed at proven risk protection of risk-exposed units based upon technological means. In contrast to the standard practice, the resource-pooling systems also achieve reproducible, dynamically adjustable operations with the desired technological, repeatable accuracy, inasmuch as it is completely based upon technological means, a process flow and process control/operation.

The switching device 11 and/or the resource-pooling systems (not shown) comprise an assembly module 5 for processing risk-related component data 211, 221, 231 and for providing the likelihood 212, 222, 232 of said risk exposure for one or a plurality of the pooled risk exposure components 21, 22, 23, etc. based upon the risk-related component data 211, 221, 231. The resource-pooling systems 10 and 12 as well as the switching device 11 can be implemented as a technological platform, which is developed and implemented to provide risk transfer through a plurality of (but at least one) payment transfer modules 41 and 42. The risk exposure components 21, 22, 23, etc. are connected to the resource-pooling system 10 by means of the plurality of payment transfer modules 41 that are configured to receive and store payments 214, 224, 234 from the risk exposure components 21, 22, 23 for the pooling of their risks in a payment data store 61. The storage of the payments can be implemented by transferring and storing component-specific payment parameters. The payment amount can be determined dynamically by means of the resource-pooling system 10 based upon total risk of the overall pooled risk exposure components 21, 22, 23. For the pooling of the resources, the system 1 can comprise a monitoring module 8 that requests a periodic payment transfer from the risk exposure components 21, 22, 23, etc. to the resource-pooling system 1 by means of the payment transfer module 41, wherein the risk protection for the risk exposure components 21, 22, 23 is interrupted by the monitoring module 8, when the periodic transfer is no longer detectable by means of the monitoring module 8. In one embodiment, the request for periodic payment transfers is automatically interrupted or waived by means of the monitoring module 8, when the occurrence of indicators for a risk event is triggered in the data flow pathway of a risk exposure component 21, 22, 23. Analogously, the first resource-pooling system is connected to the second resource-pooling system of the second insurance system by means of a second payment-transfer module 42 that is configured for receiving and storing payments from the resource-pooling system 10 of the first, insurance system for the transfer of risks associated with the pooled risks 50 of the risk exposure components 21, 22, 23 from the first insurance system 10 to the second insurance system 12.

Figure 3:
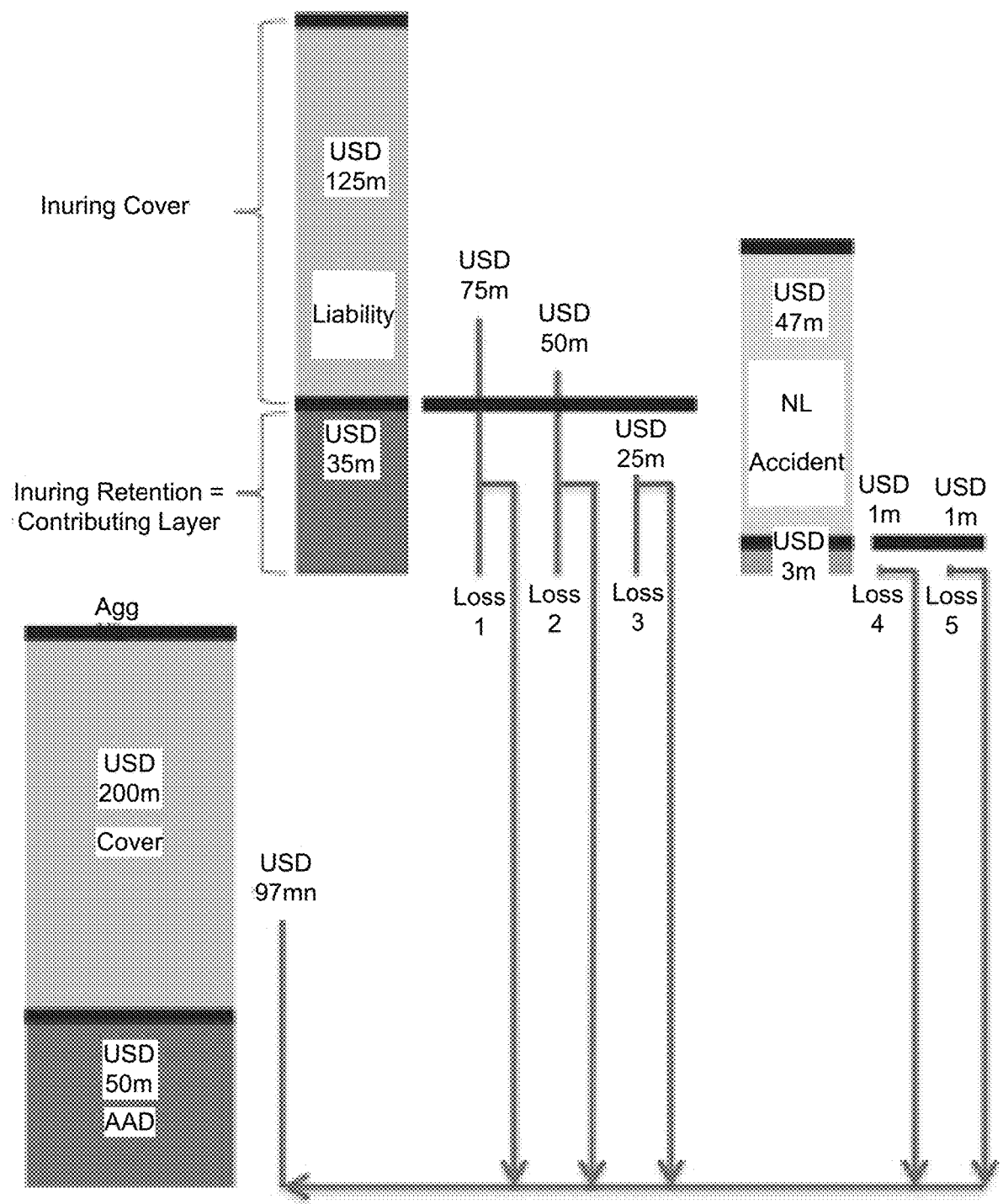
FIG. 3 shows a block diagram schematically illustrating an example of the structure with contributing layers for covered segments according to FIG. 2. The example of FIG. 3 is a classic clash loss event by a sudden and accidental event caused by an oil rig explosion. Three liability losses, i.e. three risks transferred to the first insurance system 10, stemming from three different risk transfers that were affected by the same event. Inuring second insurance system 12 cover on a per risk basis: USD 125 m xs. USD 35 m for Liability and USD 47 m xs. USD 3 m for WC. Additionally, in the example, there are 2 WC losses that remain fully in the USD 3 m retention of the inuring WC excess of loss per risk treaty (as for liability, the contributing layer is identical to the inuring retention). The part of the individual losses that exceeds the deductible is covered in the inuring second insurance systems 12 cover. The part of the individual losses that remain in the retention of the first insurance system 10 and are part of the clash loss event are collected from the contributing layer and ceded into the aggregate excess of loss tower.
Figure 4:
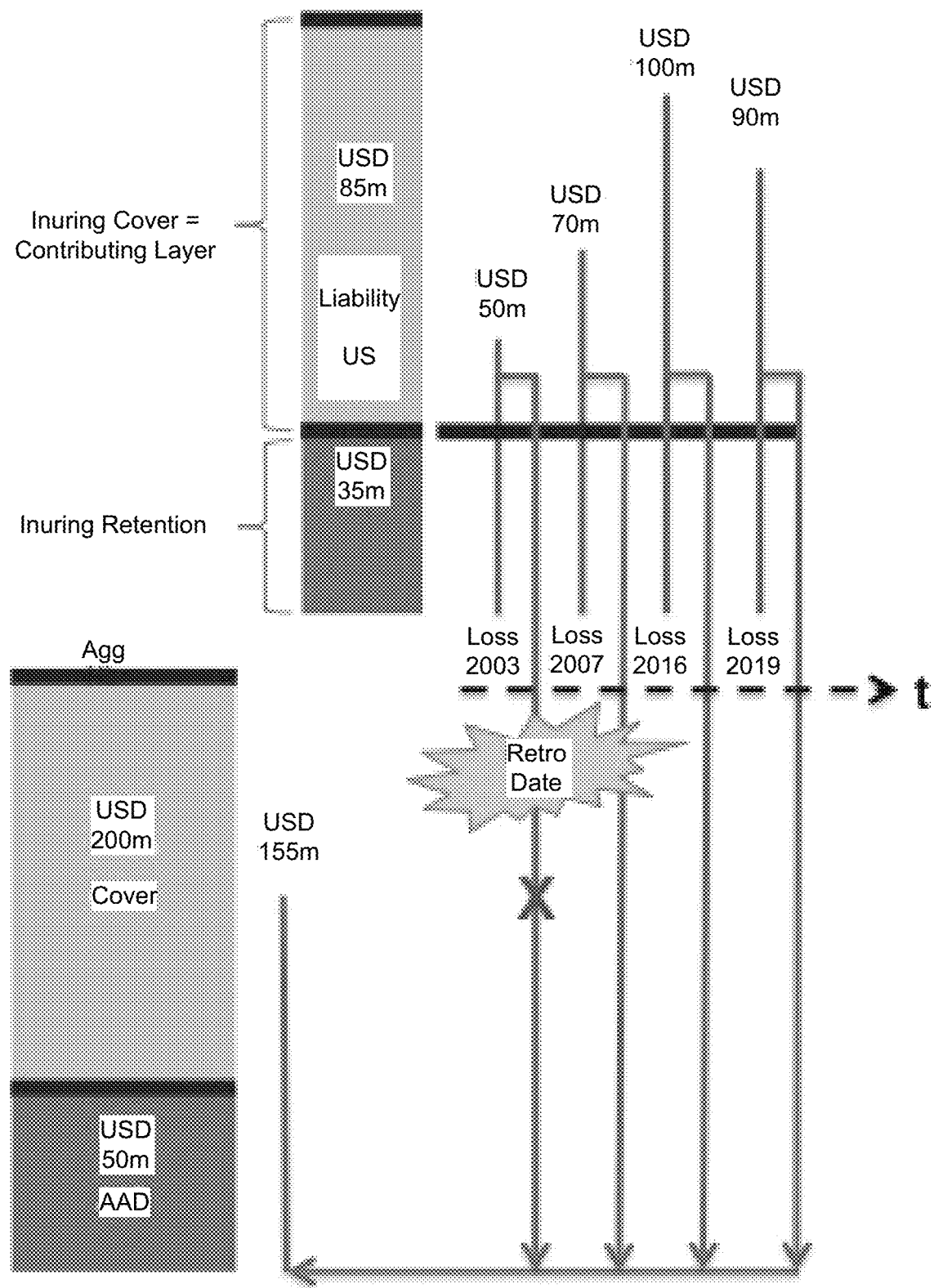
FIG. 4 shows a block diagram schematically illustrating an example of the structure with contributing layers for covered segments according to FIG. 2. The example of FIG. 4 is an example of a serial aggregation caused by a serial event. Four liability losses, i.e. three risks transferred to the first insurance system 10, stemming from four different Endocrine disruptor manufacturers. Inuring second insurance system 12 cover on a per event basis: USD 85 m xs. USD 35 m for Liability US. The first insurance system 10 is tracking all Endocrine disruptor losses as one single clash event in its operational claims system. For Serial Aggregation clash events, one deductible per first insurance system 10 can be expected to apply; this is defined in the second insurance's 12 internal claims reporting procedure. The contributing layer is equal to the inuring cover.
Figure 5:
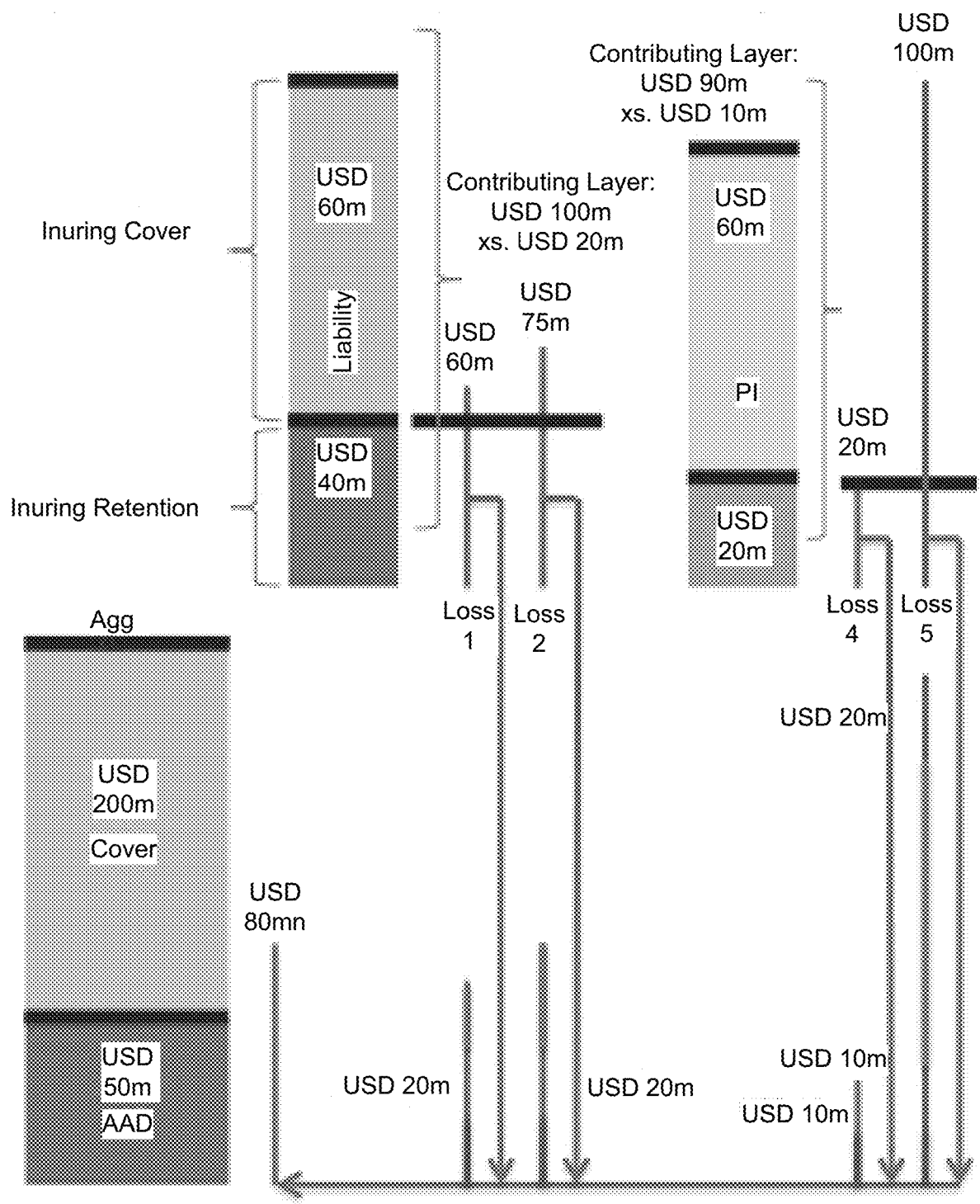
FIG. 5 shows a block diagram schematically illustrating an example of the structure with contributing layers for covered segments according to FIG. 2. The example of FIG. 5 is an example of a systemic failure, i.e. here misselling of investment products shown on the financial fraud example. There are two losses under to the liability cover, i.e. under two serial occurrence of a risk transferred to the first insurance system 10, and another two losses under the PI cover. The contributing layer for liability provides USD 100 m of coverage in excess of USD 20 m, whereas the Contributing Layer for PI amounts to USD 90 m excess a deductible of USD 10 m The contributing layers attach lower than the inuring deductibles to counter the fact that systemic failure type of clash losses have to be aggregated per first insurance system 10. This also leads to a balanced situation where the second insurance system 12 has to bear a self-insured retention of the entire loss. The contributing layers can also be larger than the inuring amount of cover. As the clash loss event cover works net of inuring second insurance system 12, that part of a loss which is borne by the inuring second insurance system 12 cover will not be covered as part of the clash loss event risk transfer to avoid breaching the principle of double indemnity.
Figure 6:
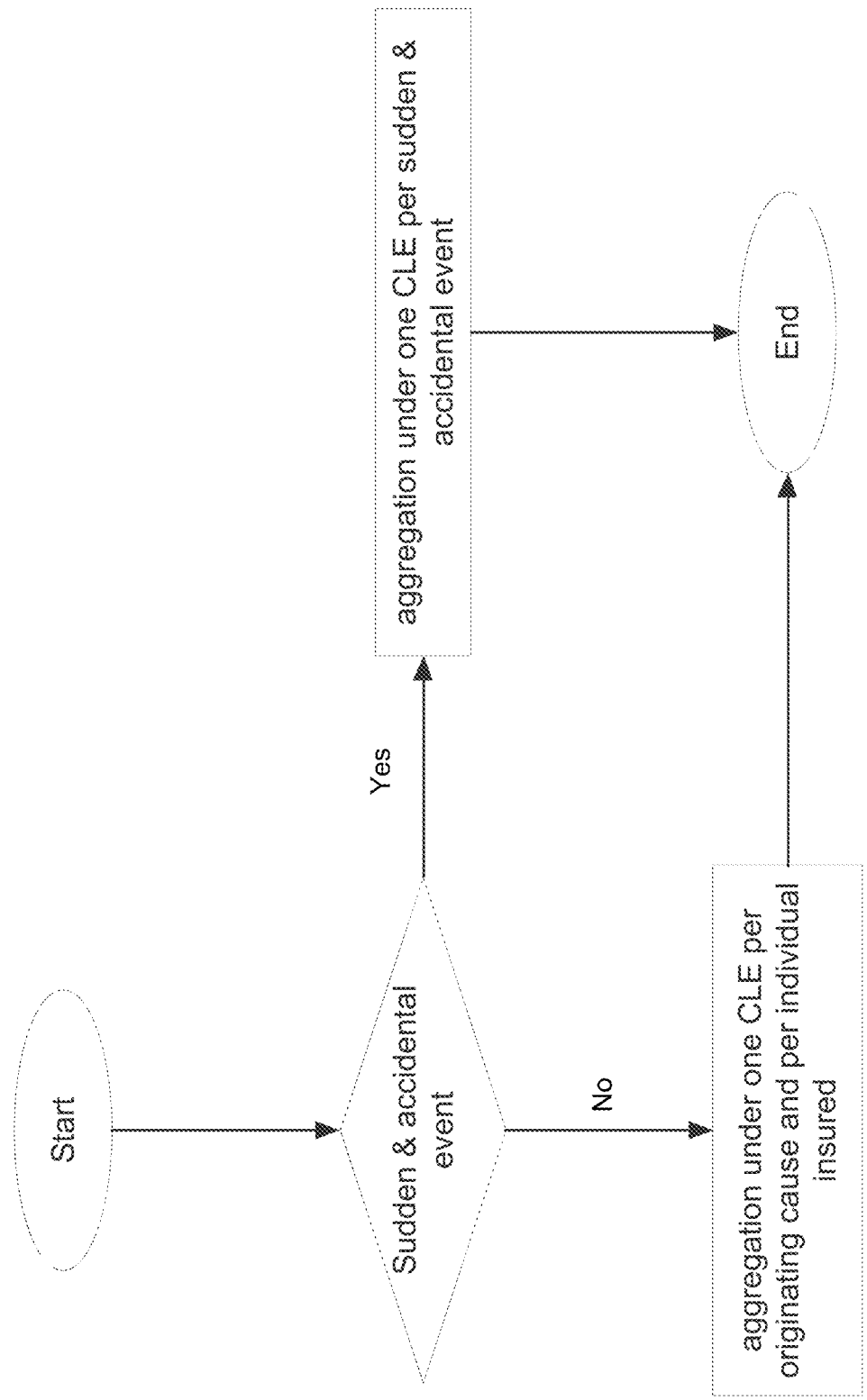
FIG. 6 shows a block diagram schematically illustrating an exemplary structure of the interaction of the clash loss event parameterization and definition with the automated aggregation by the system 1. A clash loss event is aggregated per sudden and accidental event if the event fulfils the criteria of the parameterization and definition. If a clash loss cannot be parameterized or defined as sudden and accidental, the event can be defined per originating cause, which allows for a much broader aggregation If an event is defined on an origination cause, claims e.g. can be aggregated per risk exposed component 21, 22, 23, since an aggregation over several risk exposed component 21, 22, 23, i.e. transferred risks, could lead to a much higher exposure. However, other mechanisms are not excluded by the structure of the system 1.
Figure 7:
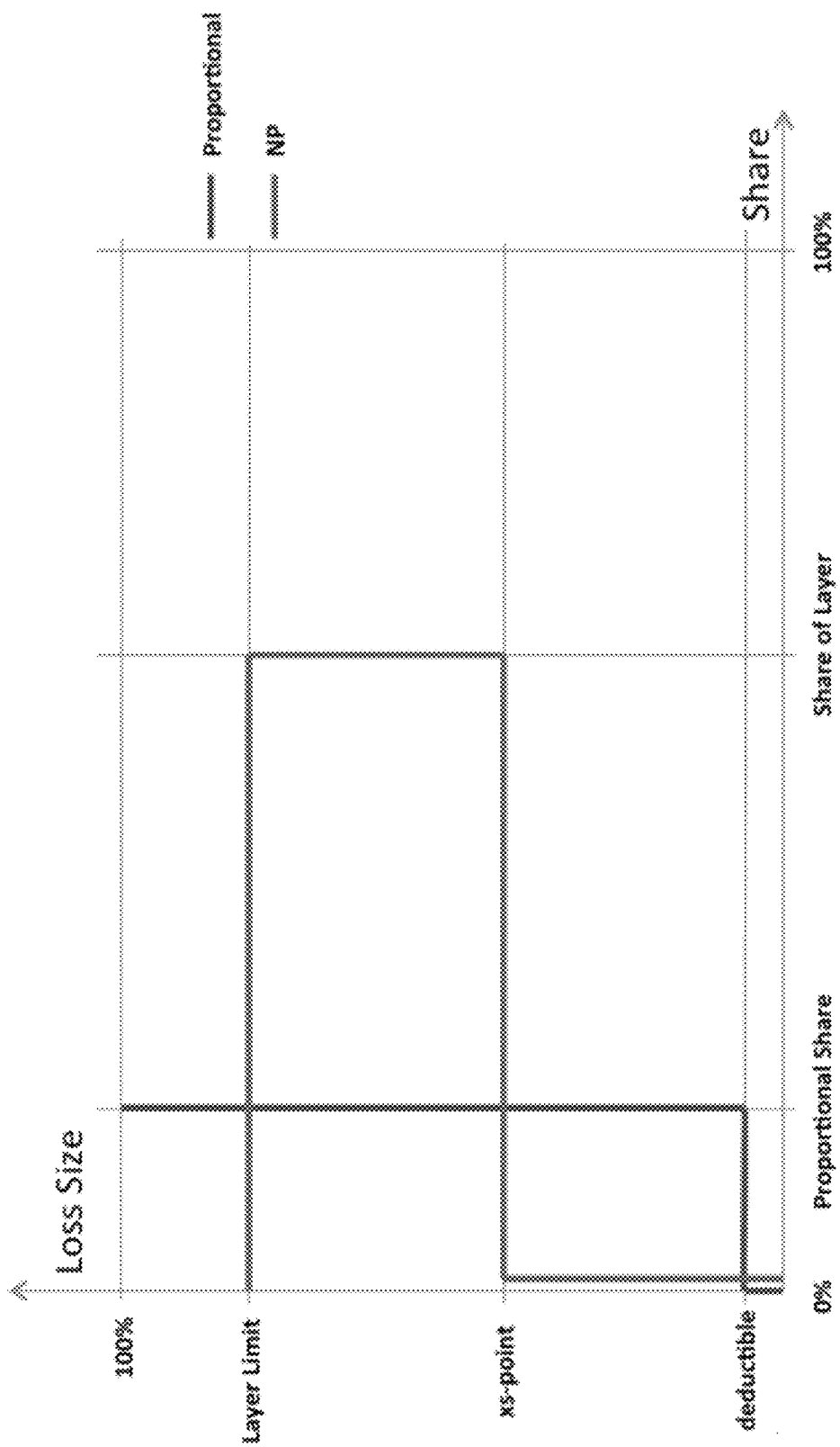
FIG. 7 shows a block diagram schematically illustrating the coupling structure of prior art systems using either a proportional or non-proportional switching structure.

The coupling and switching of the two complementary, autonomously operated resource pooling systems is achieved by the event-triggered switching device 11 for generating and transmitting appropriate steering signals to the first and second resource pooling systems. It has to be mentioned, that the inventive system can work on retentions, as described above, but can also work on defined contribution layers (for per event XL protections instead of per risk XL) that can be realized more general than retentions only. I.e., the invention not only works on a retention basis (of XL/R covers) but also by collecting losses from contributing layers from inuring XL/E covers. As discussed above, different options are, inter alia, explained by FIGS. 3/4/5/6.

As indicated in FIG. 1, the system 1 includes a data storing module for capturing the risk-related component data and multiple functional modules; e.g., namely the payment transfer modules 41 and 42, the core engine 3 with the risk event triggers 31, 32, the assembly module 5, or, the operating module 30. The functional modules can be implemented at least partly as programmed software modules stored on a computer readable medium, connected in a fixed or removable manner to the processor(s) of system 1 or to associated automated systems. One skilled in the art understands, however, that the functional modules can also be implemented fully by means of hardware components, units and/or appropriately implemented modules. The system 1 and its components, in particular the first and second resource pooling systems, the switching device 11, the trigger modules 31,32, the measuring devices 215, 225, 235 with the interfaces 213, 223, 232, the assembly module 5, and the payment transfer modules 41, 42, can be connected via a network 91, such as a telecommunications network. The network 91 can include a hard-wired or wireless network; e.g., the Internet, a GSM network (Global System for Mobile Communication), an UMTS network (Universal Mobile Telecommunications System) and/or a WLAN (Wireless Local Region Network), and/or dedicated point-to-point communication lines. In any case, the technical electronic money-related setup for the present system comprises adequate technical, organizational and procedural safeguards to prevent, contain and detect threats to the security of the structure, particularly counterfeiting threats. The automated resource-pooling systems furthermore comprise all the necessary technical means for electronic money transfer and link-up association; e.g., as initiated by one or more associated payment transfer modules 41, 42 via an electronic network. The monetary parameters can be based upon any possible electronic and transfer means, such as, e.g., e-currency, e-money, electronic cash, electronic currency, digital money, digital cash, digital currency, or cyber currency etc., which can only be exchanged electronically. The first and second payment data stores 61, 62 provide the means for associating and storing monetary parameters associated with any single one of the pooled risk exposure components 21, 22, 23. The present invention can involve the use of the mentioned networks, such as, e.g., computer networks or telecommunication networks, and/or the internet and digital stored value systems. Electronic funds transfers (EFT), direct deposits, digital gold currency and virtual currency are further examples of electronic money modalities. Transfers can furthermore involve technologies such as financial cryptography and technologies for enabling such transfers. For the transaction of the monetary parameters, it is preferable that hard electronic currency is used, without technical possibilities for disputing or reversing charges. The resource-pooling systems support, for example, non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the systems 10, 12. This means that using hard electronic currency is rather akin to a cash transaction. Beyond this, it is also conceivable to use soft electronic currency, such as currency that allows for the reversal of payments, for example having a "clearing time" of 72 hours, or the like. The manner and path of the electronic monetary parameter exchange applies to all connected systems and modules related to the resource-pooling systems of the present invention, such as, e.g., the first and second payment transfer modules 41, 42. The monetary parameter transfer to the first and second resource-pooling system can be initiated by a payment-transfer module 41 or respectively 42 or upon request by the related resource-pooling system.

The system 1 comprises an event-driven core engine 3 comprising risk event triggers 31, 32 for triggering component-specific measuring parameters in the data flow pathway 213, 223, 233 of the assigned risk exposure components 21, 22, 23. The data flow pathway 213, 223, 233 can, e.g., be monitored by the system by means of measuring devices 215, 225, 235 that are connected to a data flow pathway 9 via the interfaces 213, 223, 233; in particular, it can be monitored by the resource-pooling systems and/or the switching device 11, thereby capturing component-related measuring parameters of the data flow pathway 213, 223, 233 at least periodically and/or within predefined time periods. According to a variant, the data flow pathway 213, 223, 233 can, for example, also be dynamically monitored by the system 1, such as, for example, by triggering component-measuring parameters of the data flow pathway 213, 223, 233 that are transmitted from associated measuring systems 215, 225, 235. By triggering the data flow pathway 213, 223, 233, which comprises dynamically recorded measuring parameters of the concerned risk exposure components 21, 22, 23, the system 1 is able to detect the occurrence of predefined risk events based upon predefined trigger parameters. Further, the system 1 can, e.g., also dynamically monitor different stages during the progress of the impact of a risk event 104 on the risk exposure component 21, 22, 23 causing one or more loss events 1051, 1052, . . . , 1057 in order to provide appropriately adapted and graduated risk protection for a specific risk exposure component 21, 22, 23. Such a risk protection structure is based upon received and stored payments 214, 224, 234 from the related risk exposure component 21, 22, 23 and/or related to the total risk 50 of the resource-pooling system, based upon the overall transferred risks of all pooled risk exposure components 21, 22, 23.

In summary, the clash loss event triggered risk transfer system 1, through the structure shown in FIG. 1, provides an independent risk protection for the variable number of risk exposure components 21, 22, 23 by means of the two automated complementary coupled insurance systems 10/12 with the automated resource pooling systems. In the way described, the risk exposure components 21, 22, 23 are connected to the first resource-pooling system of the first insurance system 10 by means of the plurality of first payment-transfer modules 41 configured for receiving and storing payments from the risk exposure components 21, 22, 23 for the pooling of their risks of losses 1051, 1052, . . . , 1057 as a consequence of the occurrence of defined risk events 104. Analogously, the first resource-pooling system is connected to a second resource-pooling system of the second insurance system 12 by means of a second payment-transfer module 42 configured for receiving and storing payments from the resource-pooling system of the first insurance system 10 for the transfer of risks of the pooled risks 50 of the first insurance system 10 to the second insurance system 12. For the coverage of losses, or respectively loss events 1051, 1052, . . . , 1057 associated with risks transferred to the insurance systems 10, 12, the automated resource-pooling systems are coupled, steered and operated by means of an event-triggered switching device 11 of the clash loss event triggered risk transfer system 1.

The measuring devices 215, 225, 235 are associated with the risk exposure components 21, 22, 23 in the manner described above, measuring risk-related component data 211, 221, 231 for the triggering of the occurrence a risk event 104. If the occurrence of one of the defined risk events 104 is triggered, the corresponding measured risk-related component data 211, 221, 231 are transferred upon occurrence to the first insurance system 10 and/or the clash loss event triggered risk transfer system 1. The risk-related component data 211, 221, 231 are filtered for loss parameters of loss events 1051, . . . , 1057, which occur as a consequence of one of the defined risk events 104 by means of a filtering module (not shown) based upon filtering parameters 103. The defined filtering parameters 103 comprise a parameterization of all defined risk events 104, providing the boundary conditions for the triggering of the risk events 104.

The measured risk-related component data 211, 221, 231 associated with different loss events 1051, . . . , 1057 are scanned for measurements of two different loss events 1051, . . . , 1057 that trace a pattern to the same risk event 104 which is based at least upon time and location parameters indicating a biunique relation to a single occurrence of a risk event 104 by means of risk event triggers 31, 32. If the system 1 detects a match, a corresponding link is created by means of the risk event 104 triggers 31, 32 linking the two loss events 1051, . . . , 1057. The linkage of two or more loss events 1051, . . . , 1057 with the occurrence of the same risk event 104 triggers the generation of a single unique identifier 32. In the following, the clash loss event triggered risk transfer system 1 associates each loss event 1051, . . . , 1057 linked to the occurrence of the same risk event 104 with the same single unique identifier 32. A single unique identifier 32 can e.g. be technically set by means of a unique discrete alphanumeric string and stored associated to the corresponding loss event 1051, . . . , 1057.

After the capture of the loss events 1051, . . . , 1057 by the first insurance system 10 and/or by the risk event triggers 31, 32 of the core engine 3, the loss events 1051, . . . , 1057, i.e. the respective parameters, are transferred to the second insurance system 12. Transferring the loss events 1051, . . . , 1057, the association of the single unique identifier 32 is verified to be in compliance with a loss reporting system of the second insurance system 12 by means of a core engine 3, i.e. synchronized between the two loss reporting systems (not shown). As mentioned before, the pursuant to the condition that a clash coverage structure protects the first insurance system from multiple claims arising from the occurrence of a single event, i.e. being technically mappable to the same event, the definition of "clash event" is critical in the reinsurance contract. This problem is also reflected by the prior art systems, where one of the problems of casualty clash risk transfer systems is the event parameterization and definition. The definition is often a source of conflict by balancing the transfer of risks and the resources between the first and second insurance system 10, 12, e.g. because of the lack of a clear legal definition that is agreeable to both parties. Since the heart of the present invention is laid on tapping into pre-defined internal processes used by first insurance systems 1 to define what an event is, the present invention does not show the deficiencies of the prior art systems. Together with the legal definition, the present inventions allows for a clearer event definition and aggregation of claims. Clearly, for the operation of the present invention, the internal definitions and processes of the first insurance system 10 should not be too woolly and should have a certain standard. However, the latter problem can easily be tackled and mitigated by the present system by setting additional boundary conditions or definitions. These additional boundary conditions form additional layers of risk transfer, which enables the second insurance system 12 to operate clash covers on the basis of an originating cause. The additional boundary conditions should be regarded as minimum operatable conditions. Further requirements are needed and should be determined as part of the automated mitigation and underwriting process for the risk transfer.

For the present system 1, the parameterization of "clash loss event" can be based on the definition of each and every loss or series of losses arising out of, or related to, or connected to, (i) one sudden and accidental event directly interconnected in both time and location, and/or (ii) an originating cause subject to, in case of both (i) and (ii), being a) recorded within the second insurance systems 12 claims reporting system under one single "Unique Identifier", and b) in full compliance with the second insurance system's defined claims reporting procedures. The appropriately tuned risk transfer to the second insurance system 12 warrants that the first insurance system 10 will not make any claim in respect of any clash loss event unless two or more claims are involved in that clash loss event. The operation of the second insurance system 12 further warrants that with respect to any claims that are subject to two or more claims involved in a clash loss event. Further, the present system also warrants that first and second insurance systems 10,12 will not make any changes to their claims reporting procedures, without having the approval of the system. In summary, the event parameterization and definition comprises (i) A CLE must arise out of sudden and accidental event and/or an originating cause. This parameterization has on the other side also a relatively clear legal meaning and represents the first operating condition; (ii) A CLE must be recorded within the second insurance system's 12 claims reporting system under one single "Unique Identifier". Unless claims cannot be aggregated under one CLE in the second insurance system's claims reporting system, losses won't be covered by the inventive system 1; (iii) A CLE must be in full compliance with the second insurance system's defined claims reporting procedures. If the CLE itself or the aggregation of the CLE is not in line with the second insurance system's defined claims reporting procedures, losses won't be covered by the system 1; (iv) Unless two or more claims are involved in a CLE, there will be no cover by the system 1, i.e. a CLE does not consist of one large claim, but has to involve more than two claims; and (v) Under the system 1, the second insurance system 12 cannot make any changes to its defined claims reporting procedures, thus the automated system 1 eliminates any moral hazard coming from possible changes to the claims reporting procedures in order to "cheat" the structure.

Additionally, the system 1 can comprise e.g. structural limitation via a retro date, i.e. losses that occurred before the retro date are not covered by the system 1 and losses reported to the second insurance system 12 after the retro date have to be recorded in the claim reporting system within a fixed time frame, e.g. six months from date of being first reported to the second insurance system 12. Further, the system 1 con comprise a structural limitation via a sunset clause, i.e. losses must be reported to the second insurance system 12 not later than X years after expiration of the define time period and have to be recorded in the claim reporting system as part of the "clash loss event" within a defined timeframe, e.g. six (6) months from date of being first reported to the second insurance system 12. Finally, for operation, the system 1 can exclude some defined, known losses and circumstances, i.e. losses and circumstances known to the first insurance system 10 at inception will not be covered by the system 1.

As a further consequence, the defined claims reporting procedures, as mentioned above, are critical to the operation of the system 1, since the defined claims reporting procedures indirectly determine what exactly a CLE is constituted of and how such a CLE can be aggregated. The procedures can be specific to each and every first insurance system 10 and thus do not need to be generalized for the system 1. Thus, the present invention is able to operate tailor-made, which is not possible this way with the prior art systems. A due diligence of the second insurance system's claims reporting procedures before inception can be a mandatory part of the tuning and underwriting process of the operational parameters of the risk transfer. As example of triggered event categories under a possible class loss definition and parameterization, the clash loss parameterization can comprise and be the trigger basis of e.g. (1) Explosion/Offshore/Energy/Terrorism; (2) Transportation (rail disaster, aviation, motor accident); (3) Nat Cat/Bushfire/Man-Made Environmental Disaster; (4) Large Scale Food Contamination; (5) Cyber—1st party cover included in this risk transfer; (6) E&O/D&O Contagion event; (7) Latency exposures (e.g. next asbestos, silica, EMF's, Sugar, GMO's); (8) Inflation Spike; (9) Financial Crisis (incl. recession exposure); and (10) Regulatory and Legal Change (e.g. collective redress). However, the above listing shall only serve as an example.

For each risk event 104, losses of linked loss events 1051, . . . , 1057 are aggregated by means of the core engine 3 incrementing an aggregation parameter 34 associated with each single unique identifier 32 and captured by the second insurance system 12. The aggregation can e.g. be triggered by the date of the first recording of the specific single unique identifier 32 in the loss reporting system of the second insurance system 12. The aggregation can e.g. be based upon a structure with contributing layers for covered segments, which at least partially depend on the structure of the defined risk transfer from the first insurance system 10 to the second insurance system 12. A segment can e.g. be defined as a combination of a line of business structure (LoB) and a region. The risk transfer can e.g. be based upon aggregate excess of loss (Aggregate XL) risk transfer to cover the aggregate of the contributing layers. The Aggregate XL structure can e.g. be combined with defined parameters of annual aggregate deductibles (AADs). The operational parameter definition of a risk event 104 can e.g. comprise triggering one sudden and accidental risk event 104 and/or an originating cause. This has, inter alia, the advantage that the claims aggregation is clearer due to reliance on system internal risk event 104 and claimable loss event 1051, . . . , 1057 definitions and parameterizations, based upon the system-defined procedures for reporting of claims and claim reporting systems. The definition can e.g. be in addition to the common event definition. However, the application of the present invention is not restricted to to triggering on originating causes or events, but can also be used without event/originating cause. Thus, the present invention can be realized for triggering in at least two different forms: 1) by using the legal definition (S&A event and/or Originating cause) AND claims reporting procedure or 2) by using the claims reporting procedure ONLY, without a legal definition.

The aggregate XL or stop-loss structure allows risk transfer on an event basis, preferably for mixed catastrophe perils. Thereby the system 1 can e.g. only cover CXL retention of the possible risk exposure components 21, 22, 23, 24, including for the occurrence of single catastrophe perils like freeze and flood. The system 1 also allows for appropriate event franchise deductibles and event caps. Preferably, the system risk transfer covers risks above the high-frequency area of statistically frequent risk events. In principle, the present system 1 is able to capture risk transfers of all kind of property and non-property excess-of-loss, including catastrophe excess-of-loss (Cat XL), risk excess-of-loss (Risk XL) and non-standard covers such as aggregate excess-of-loss (Aggregate XL), stop-loss, umbrella and reinstatement premium protection (RPP). However, the system 1 primarily is directed to cover all forms of aggregate excess structures, i.e. risk transfers for covering a first insurance system 10 for an aggregate (or cumulative) loss or defined amount of losses in excess of a specified aggregate amount. In particular, the system 1 can be applied to all kind of excess of loss structures, wherein the second insurance system 12 automatically covers losses of the first insurance system 10 by the size of loss, i.e. the amount, by which the losses incurred (net after specific risk transfer to the second insurance system 12 for recoveries) by the first insurance systems 10 during a specific period (i.e. twelve months) exceed either a defined amount or a defined percentage of some other parameterizable measure, such as aggregate net premiums over the same period or average risk transfer cover in force for the same period. This structure of risk transfer by a second insurance system 12 is also referred as stop-loss reinsurance, stop-loss-ratio reinsurance, or excess of loss ratio risk transfer structures.

In the event of the detection, that the aggregation parameter 34 exceeds a predefined aggregate excess of loss threshold 35, an activation signal is generated by means of the switching device 11 based upon the overage of the aggregation parameter 34. The switching device 11 triggers the complementary activation of the first and second resource-pooling system by means of the generated activation signal by transferring the activation to the first and/or second resource pooling system to provide to risk protection to the risk exposure components 21, 22, 23. The activation of the first and/or second resource pooling system is based upon a definable risk transfer structure comprising covered segments with scopes of covered risk lines and regions, providing corresponding threshold values for the complementary switching and activation. The switching device 11 comprises e.g. a table, e.g. implemented as a searchable, hierarchically structured data hash table. The table provides data structures for storing a plurality of risk transfer segments by means of assigned segment values 511, 512, 513. In this way, the i-th risk transfer segment comprises the i-th measure for a part of a segmented layer, i.e. a part of the i-th risk contribution, of the total pooled risk 50. By means of the measures of the parts of the segmented risk layers of the pooled risk, the risk transfer is provided by the structure of the plurality of risk transfer segments by means of the assembly module 5. As already explained in detail, the structure with contributing layers for covered segments which are at least partially dependent on the structure of defined risk transfer from the first insurance system 10 to the second insurance system 12. A segment can e.g. be defined as a combination of a line of business structure (LoB) and a region.

For example, the risk transfer structure used by the clash loss event triggered risk transfer system 1 can be generated by means of the assembly module 5 by interpolating the assigned segment values 511, 512, 513 as support points or interpolation points. For the connection of the supporting interpolation points, i.e. the segment values 511, 512, 513, structured by the structure of the risk transfer segment, the assembly module 5 can provide an appropriate activation structure of the switching device 11, linking the different segment values 511, 512, 513 to each other. The risk transfer structure generated by the assembly module 5 can e.g. comprise an appropriate parameterization or interpolation correlation. However, the risk transfer structure is based upon the typical stop-loss structure based upon the segment values 511, 512, 513. As a variant, the assembly module 5 can also provide the risk transfer, i.e. the appropriate transfer structure, by connecting the assigned segment values 511, 512, 513 as support points of the risk transfer by otherwise interpolating or building a smooth connection over all assigned segment values 511, 512, 513, e.g. in a continuously adjustable manner. As an additional variant, the input to the assembly module 5 for providing the risk transfer structure can e.g. be direct parameters of a parameterizable form of a risk transfer. In the latter variant, the risk transfer of the system 1 is only to based upon risk transfer segments with assigned segment values 511, 512, 513, relying directly on the parameters of the representing risk transfer structure. Therefore, in this case, the adjustment or optimization of the risk transfer by the first insurance system 10 and/or the risk-exposed components is directly achieved by the operational parameters of an appropriate risk transfer structure.

Figure 2:
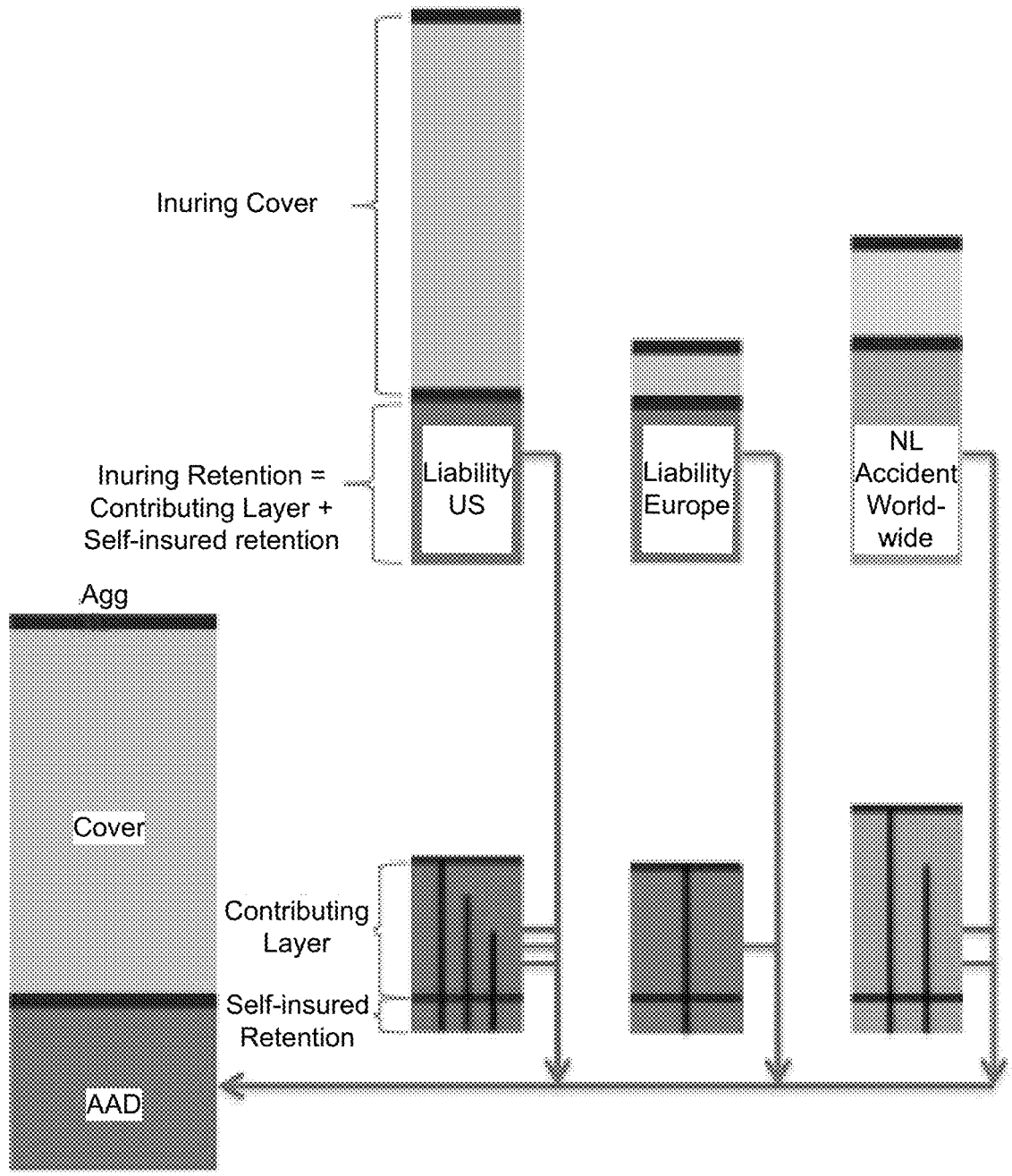
FIG. 2 shows a block diagram schematically illustrating an exemplary structure with contributing layers for covered segments that are at least partially dependent on the structure of defined risk transfer from the first insurance system 10 to the second insurance system 12, which are illustrated in FIG. 1. A segment can e.g. be defined as a combination of a line of business structure (LoB) and a region. The risk transfer can e.g. be based upon aggregate excess of loss (Aggregate XL) risk transfer to cover the aggregate of the contributing layers. The Aggregate XL structure can e.g. be combined with defined parameters of annual aggregate deductibles (AADs). The operational definition of risk events 104 can e.g. comprise triggering one sudden and accidental risk event 104 and/or an originating cause.

By means of the system 1, the claims aggregation is clearer due to reliance on an automated processed use of unique parameterizations and definitions, e.g. based upon the first and/or second claims reporting system. The definitions can be adjusted e.g. in addition by means of common event definitions. The system 1 is triggered by the date of the first recording of a clash loss event, i.e. the first reporting of a risk event 104 connected with a loss event 1051, 1052, . . . , 1057 in the second insurance system's 10 claim reporting system 12 under the one single "Unique Identifier". The system 1 can easily be combined with additional boundary conditions such as Sunset Clauses and Retro Date/Known Loss Exclusions. As an example, one clash event, i.e. a risk event resulting in a plurality of loss events 1051, 1052, . . . , 1057, can be associated with different risk transfer segments affecting e.g. three LoBs. Further, three segments can e.g. defined (Liability US, Liability Europe, NL Accident Worldwide), as shown in FIG. 2. In this case, the inuring structure works on an excess of loss per risk basis, the contributing layers cover clash of inuring retentions.

In a variant, the segment values 511, 512, 513 of the risk transfer segments are self-adapted by means of the system 1, thereby optimizing the resulting risk transfer structure. However, the optimization can also be performed by dedicated external means. The system 1 and/or the dedicated external means can e.g. operate the optimization until a local or global maximum or minimum, respectively, is achieved, or until a predefined target value is achieved. Finally, the optimization can be based upon different sets of optimization criteria or by a specific selection of a certain set of optimization criteria. As a condition for optimization, it is clear that the risk transfer structure should be related to the risk assumed or predicted, and preferably, if the risk assessment is correct, with the occurrence of the corresponding risk events within the defined time frame. By means of a core engine 3 of the switching device 11, a payment parameter is assigned to each clash loss event based upon the aggregation excess of loss threshold 35 and the aggregation parameter 34 to the second resource pooling system 12. The payment parameters are accumulated to arrive at a total payment sum, wherein to the switching device 11 comprises a capturing device 111 for capturing payment transfer parameters from the first payment-transfer module 41 to the second payment-transfer module 42. Upon triggering a transfer of the total payment sum at the second payment-transfer module 42, the risk exposure of the first insurance system 10 associated with the risk transfer has been transferred to the second insurance system 12. In a variant, the switching device 11 can further comprise capturing means 11 for capturing a transfer of payment assigned to one of the risk transfer segments from the first insurance system 10 at the second payment-transfer module 42, and wherein the assigned risk transfer segment is activated, and wherein the risk exposure of the first insurance system 10 associated with the assigned risk transfer segment is transferred to the second insurance system 12.

Further, the core engine 3 comprises event-driven triggers 31, 32 for triggering action in the data flow pathway 213, 223, 233 of the measuring devices 215, 225, 235 associated with the risk exposure components 21, 22, 23, i.e. triggering the occurrence of risk event 104 or loss event 1051, 1052, ..., 1057. The data flow pathways 213, 223, 233 can be connected to an overall data flow pathway 9 and/or to the network 91, as described above. The measuring devices 215, 225, 235 comprise the interfaces 213, 223, 233 for the purpose of allowing data access to measuring devices 215, 225, 235. If an occurrence of a risk event 104 is triggered in the data flow pathway 9, the corresponding risk segment is determined within the table by means of the core engine 3 based upon the measured actual loss, and a corresponding activation signal is generated by means of the switching device 11 based upon the determined risk segment and the measured actual loss, wherein the switching device 11 triggers the complementary activation of the first and second resource-pooling systems by means of the generated activation signal by transferring the activation to the first and/or second resource pooling system in order to provide risk protection to the risk exposure components 21, 22, 23. In this way, the present invention provides the utmost in flexibility and an optimum technical solution for coupled and complementary switched insurance systems with associated resource pooling systems.

The triggers 31, 32 can comprise triggering for the occurrence of a predefined risk event 104 or stages of the impact of predefined risk events 104 or loss events 1051, 1052, ..., 1057 by means of the measuring devices 215, 225, 235. The risk events can, e.g., be any transferable risk that meets the criteria for risk transfer or insurance operability. The concept of insurable risk underlies all decisions and signaling as conducted by the system 1 and the switching device 11, respectively. In summary, criteria for defining the possible risk events, captured by the system 1, can, for example, be based upon requiring a sufficiently large number of similar exposure units, a definite loss, an accidental loss, i.e. a size of loss outside the control of the risk-exposed component 21,22,23; i.e., the loss is meaningful from the perspective of the risk-exposed component 21,22,23, affordable premiums, calculable and/or measurable and/or parameterizable losses, a limited risk of catastrophically large losses, i.e. requiring that the transferable risk concern losses which are independent and non-catastrophic. Moreover, for a risk to be transferable, i.e. capturable by the system 1, several criteria must be met: (i) The resource pooling system 1 must be able to determine a premium high enough to cover not only the expenses of claims but also to cover the first resource pooling system's effort. For example, it is possible to exclude risks, which are catastrophic or so large that no isolated resource pooling system can cover the loss. (ii) The nature of the loss must be definite and measurable. (iii) The loss can be defined as random in nature, otherwise the transferred risk can engage in adverse selection (antiselection). In any event, the risk events can comprise any transferable risk whose occurrence is measurable by measuring devices 215, 225, 235. The triggers 31,32 can, e.g., also comprise additional triggers, triggering other criteria and boundary conditions, which are not mentioned here. It is also possible that the trigger 31,32 are adapted dynamically by means of the system 1, when new measuring devices 215, 225, 235 are detected by the system 1, and/or new risk events have to be covered by the system 1, i.e. new risks are pooled by the first resource pooling system 10.

In addition to the adaptation of the triggers 31, 32, 33, the amount of requested payments from the risk exposure components 21, 22, 23 can be accordingly adjusted by the system 1 and/or the resource-pooling system 11. Therefore the receipt and preconditioned storage 61 of payments 214, 224, 234 from risk exposure components 21, 22, 23 for the pooling of their risks can be determined dynamically, based upon total risk 50 and/or the likelihood of the risk exposure of the pooled risk exposure components 21, 22, 23 to improve the operational and functional security of the system 1 even further. The number of pooled risk exposure components 21, 22, 23, can be dynamically adapted by means of the system 1 and/or the resource-pooling system to a range where non-covariant, occurring risks that are covered by the resource-pooling system 1 affect only a relatively small proportion of the total pooled risk exposure components 21, 22, 23 at any given time. In another variant, the pooled risk transfers from first resource pooling systems can also be dynamically adaptable by means of the second resource-pooling system to a range where non-covariant, occurring risks covered by the second resource-pooling system affect only a relatively small proportion of the total pooled risk transfers from first resource pooling system at any given time. The total risk 50 of the pooled risk exposure components 21, 22, 23 comprises a different segmentable risk contribution 511, 521, 531 of each pooled risk to a risk exposure component 21, 22, 23, which is associated with risk exposure in relation to the occurrence of a risk event. The triggering parameters of the covered risk events can be contained and stored in a predefined searchable table, such as, e.g., an appropriately structured hash table, of predefined risk events, or respectively risk event parameters. The corresponding losses occur as a consequence of the occurrence of a risk event at risk exposure components 21, 22, 23, ... with regard to one of the searchable risk events; i.e., the possible need of risk exposure components 21, 22, 23, ... to be covered by the pooled resources of the resource-pooling systems is linked to the risk of the occurrence of a risk event that requires resolving the loss in order to avoid operational interruption, or the like.

In the event of the triggering of an occurrence of a risk event on the data flow pathway 213,223,233 of a risk exposure component 21, 22, 23, i.e. if triggering of an occurrence of a risk event 104 in the data flow pathway 213, 223, 233, a corresponding trigger-flag, e.g., can be activated by means of the resource-pooling system, and a parametric or otherwise predefined transfer of payments can be assigned to this corresponding trigger-flag. A loss event 1051, 1052, . . . , 1057 associated with the occurrence of a risk event 104 can, e.g., be distinctly covered by the resource-pooling system, based upon the respective trigger-flag and based upon the received and stored payment parameters 214, 224, 234 from risk exposure components 21, 22, 23 via the parametric or otherwise predefined transfer from the resource-pooling system to the risk exposure component 21, 22, 23, etc. The payment transfer modules 41,42 can, as an input device, comprise one or more data processing units, displays and other operating elements, such as a keyboard and/or a computer mouse or another kind of pointing device. As mentioned previously, the operation of receipt of the payments with regard to the risk exposure components 21, 22, 23 is monitored on the basis of the stored component-specific payment parameters in the payment data store 61. The different components of the system 1, such as, e.g. the resource pooling systems, the switching device 11, the payment transfer modules 41, 42, the core engine 3 and the assembly module 5 can be connected via a network 91 for signal transmission. The network 91 can comprise, e.g., a telecommunications network, such as a hard-wired or wireless network, e.g., the Internet, a GSM network (Global System for Mobile Communications), an UMTS network (Universal Mobile Telecommunications System) and/or a WLAN (Wireless Local Area Network), a Public Switched Telephone Network (PSTN) and/or dedicated point-to-point communication lines. The payment transfer modules 41,42 and/or core engine 3 and the assembly module 5 can also comprise a plurality of interfaces for connecting to the telecommunications network while adhering to the transmission standard or protocol. In one variant, the payment transfer module 41,42 can also be implemented as a device that is external to the system 1, which provides the risk transfer service via the network for signal transmission, e.g., by a secured data transmission line.

As mentioned, a loss associated with the risk event and allocated by a pooled risk exposure component 21, 22, 23 can, e.g., be distinctly covered by the resource pooling system of the first insurance system by means of a transfer of payments from the first resource-pooling system to said risk exposure component 21, 22, 23, wherein a second transfer of payment from the second resource pooling system 12 to the first resource pooling system is triggered by means of the generated activation signal based upon the measured actual loss of the risk exposure component 21, 22, 23. However, in an embodiment relative to the above, loss events 1051, 1052, . . . , 1057 corresponding to the risk that is transferred to the second resource pooling system can, e.g., also be directly defined by the second resource pooling system 12 by transferring resources from the second resource pooling system to the concerned risk exposure components 21, 22, 23 by means of the second payment-transfer module 42.

Finally, in a further specified embodiment, an independent verification risk event trigger of the system 1 can be activated in the event that the occurrence of indicators for one of the predefined risk events is triggered in the data flow pathway 213, 223, 233 of a risk exposure component 21, 22, 23, etc. by means of the risk event trigger 31,32, and wherein the independent verification risk event trigger, additionally, is triggering with regard to the occurrence indicators for one of the predefined risk events in an alternative data flow pathway 215, 225, 235 with independent measuring parameters from the primary data flow pathway 213, 223, 233 in order to verify the occurrence of the risk event at the risk exposure component 21, 22, 23, etc. As a variant, the parametric or otherwise predefined transfer of payments is only assigned to the corresponding trigger-flag when the occurrence of the risk event at the risk exposure component 21, 22, 23, etc. has been verified by the independent verification risk event trigger.

In the present system 1, an event 104 and 1051, 1052, . . . , 1057 is not only defined by the operational parameter definition and corresponding parameterization of the "sudden and accidental event" conditions and an event based upon "an originating cause", but also relies on the definition of the first and/or second insurance claim reporting procedures and systems. The trigger is the date of the first recording of the clash loss event in the claim reporting system of the second insurances system under the one single "Unique Identifier". This allows for a highly personalized and flexible cover, allowing for a structure that is tailor-made to the protection needs of the first insurance system 10, and of the scope of covered lines and regions (covered segments). Further, the clash loss event triggered system 1 has the advantage that the applied aggregate excess of loss structure is straightforward and well understood. However, there are also non-technical advantages of the present system 1 inasmuch as the system 1 creates a limited reliance on court decisions with regards to the interpretation of event language, which increases in a certain and predictable manner with the cover. The system 1 allows for a clear view of how losses are aggregated. Scope of claims aggregation is clearer due to reliance on clash loss definitions and parameterization of the system 1, based upon the internal claim reporting systems and procedures of the first and/or second insurance system 10,12. The system 1 allows to refine the automated internal claims reporting procedures through the reduction of administrative burden and through the support of operational excellence. Further, the trigger ensures the second insurance system's cover is in place when events are detected. The annual allocation is simple and mitigation of risks can be started as soon as a clash loss event is recognized. The system-1 furthermore allows a seamless integration with existing risk transfer covers and protections, so that there is no need to adapt inuring risk transfers or covers. Finally the system 1 also allows prospective and retrospective coverage.

It is important to note, that loss events 1051, 1052, . . . , 1057 associated with a risk event 104 not previously reported, are only triggered, if the risk event 104 arises from (i) one sudden and accidental event directly interconnected in both time and location, and/or (ii) an originating cause. As to both (i) and (ii), loss events 1051, 1052, . . . , 1057 must be captured in the claim reporting system of the first insurance system 10 under one single "Unique Identifier" and in compliance with claim reporting system and procedures of the second insurance system 12. The "Unique Identifier" can e.g. be implemented as a discrete alphanumeric string that (a) clearly identifies a clash-loss-event-related item, and e.g. (b) is different from a possible risk transfer identifier or policy number. Only loss events 1051, 1052, . . . , 1057 reported after a specified retro date, but not later than a period stated in a defined parameter set as e.g. a Sunset Clause, can be aggregated into a clash loss event.

The system technically involves and provides a double check process, meaning (i) the event is captured and entered into the claim reporting system 10 of the first insurance system 10, pursuant to defined parameterizations and definitions, and (ii) such entry is separately validated, and captured as such, by the claim reporting system of the second insurance system 12 or core engine 3 before any loss event 1051, 1052, ..., 1057 is linked to one clash loss event, or respectively, the single unique identifier only. Thus, the first insurance system 10 warrants that (i) at least 2 loss events 1051, 1052, ..., 1057 associated with the same risk event 104 are triggered prior to its making any loss event 1051, 1052, ..., 1057 transfer to the second insurance system 12 for clash loss event coverage, and (ii) no changes to the claim reporting system by the first insurance system 10 can by made without recognition by the second insurance system 12, due to the synchronization and double check of the loss events 1051, 1052, ..., 1057 and their linkage to the corresponding risk event 104 by means of the single unique identifier.

LIST OF REFERENCE SIGNS

- 1 Clash loss event triggered risk transfer system
- 10 First automated insurance system
  - 101 First resource-pooling system
  - 102 Filtering module
  - 103 Filtering parameters
  - 104 Risk events
  - 1051, 1052, ..., 1057 Loss events
- 11 Switching device
  - 111 Capturing device
  - 112 Loss reporting system of the first insurance system
- 12 Second automated insurance system
  - 121 Second resource-pooling system
  - 122 Loss reporting system of the second insurance system
- 21, 22, 23, 24 Risk exposure component
  - 211, 221, 231 Risk-related component data
  - 212, 222, 232 Likelihood of risk exposure of the pooled risk exposure components
  - 213, 223, 233 Interface to data flow pathway
  - 214, 224, 234 Stored payment parameters
  - 215, 225, 235 Measuring devices
- 3 Core engine
  - 30 Operating module
  - 31, 32 Risk event triggers
  - 33 Single unique identifier
  - 34 Aggregation parameter
  - 35 Aggregation excess of loss threshold
- 41 First payment transfer module
- 42 Second payment transfer module
- 5 Assembly module
  - 50 Total Risk
    - 511 Segmentation layer of first risk contribution
    - 512 Segmentation layer of second risk contribution
    - 513 Segmentation layer of third risk contribution
    - 51i Segmentation layer of i-th risk contribution
  - 51 Calculation engine of the assembly module
- 61 First payment data store
- 62 Second payment data store
- 8 Monitoring module
- 9 Data flow pathway of measuring devices
  - 91 Network

The invention claimed is:

1. A clash loss event triggered risk transfer system driven by occurrence of risk events by measuring and triggering by measuring devices and/or trigger modules measuring parameters in a data flow pathway of the measuring devices for optimized coupling and switching of two coupled automated systems, the measuring devices being associated with risk exposed components, a clash loss event being defined as a risk event causing losses at two or more of the risk exposed components by way of occurrence of a same risk event, the event triggered risk transfer system comprising:

the risk exposed components, implemented by at least one processor, that are connected to a first automated resource pooling system comprising electronic devices for automated risk-transfer of a first insurance system by a first payment-transfer module;

the first payment-transfer module implemented by the at least one processor and configured to
  connect the risk exposed components and the first insurance system, and
  receive and store payments from the risk exposed components for the pooling of their risks of losses in consequence of a hurricane or flood or fire or earthquake as defined risk events being measurable and triggerable by the measuring devices and trigger modules of the event triggered risk transfer system triggering in the data flow pathway of the measuring parameters;

a second payment-transfer module implemented by the at least one processor and configured to
  connect the first resource pooling system to a second automated resource pooling system comprising electronic devices for automated risk-transfer of a second insurance system by the second payment-transfer module, and
  receive and store payments from the first resource pooling system of the first insurance system for the transfer of risks of the pooled risks of the first insurance system to the second insurance system;

an event-triggered switch configured to couple, steer and operate the first resource pooling system and the second resource pooling system for covering losses associated with risks transferred to the first insurance system and the second insurance system by generating and transmitting, via a communication network, steering signals to the first and second resource pooling systems;

measuring devices associated with the risk exposed components, wherein the measuring devices are configured to measure risk-related component data of the occurrence of risk events by the clash loss event triggered risk transfer system, and transfer the measured risk-related component data by interface modules of the measuring devices upon occurrence, to the first insurance system, wherein, based on filtering parameters of a filter, the risk-related component data are filtered for loss parameters of loss events as a consequence of the occurrence of one of the defined risk events, wherein a core engine comprises event-driven triggers for triggering of the measuring devices associated with the risk exposed components for the occurrence of a risk event, the data flow pathway of the measuring devices being dynamically monitored by triggering the measuring parameters of the data flow pathway transmitted from associated measuring devices to detect the occurrence of risk events based upon predefined trigger parameters, wherein, using risk event triggers, the measured risk-related component data associated with different loss events are scanned for a pattern that traces measurements of two different loss events to the same risk event that is based at least upon time and location parameters indicating a biunique relation with a single occurrence of a risk event, wherein a risk event and associated loss events are only captured by the clash loss system by entering a parametrized event into a first reporting system of the first system in response to the measured risk-related component data indicating occurrence of a sudden and accidental event directly interconnected in both time and location or indicating an originating cause, by related time parameters and related location parameters based upon first filtering parameters, and wherein in the event of a match, a corresponding link is created, linking the two loss events, wherein the generation of a single unique identifier is triggered by triggering the linkage of two or more loss events to the occurrence of the same risk event, wherein each loss event linked to the occurrence of the same risk event is associated with the same single unique identifier, and wherein a single unique identifier is set by a unique discrete alphanumeric string, stored and associated with the corresponding loss event, wherein the loss events are transferred to the second insurance system providing a double check process and synchronization, wherein the loss events are entered into a second reporting system by the second insurance system upon separate recognition pursuant to defined parameterization of the clash loss event linked to the unique identifier, and wherein for each risk event, losses of linked loss events are aggregated by the core engine incrementing an aggregation parameter associated with each single unique identifier and captured by the second insurance system, the aggregation being triggered by the data of the first recording of the specific single unique identifier in the second reporting system of the second insurance system, wherein in the event of the detection of the aggregation parameter exceeding a predefined aggregate excess of loss threshold, an activation signal is generated by the event-triggered switch based on the aggregation parameter excess, wherein the event-triggered switch triggers the complementary activation of the first and second resource pooling systems using a generated activation signal by transmitting the activation to the first and/or second resource pooling system to provide risk protection to the risk exposed components, and wherein the activation of the first and/or second resource pooling system is based on a definable risk transfer structure including covered segments with scopes of covered risk lines and regions providing corresponding threshold values for the complementary switching and activation, wherein the definable risk transfer structure is generated by interpolating segment values as support points, the support points as segment values being structured by the risk transfer structure providing the activation signaling of the switching device linking the different segment values to each other, and wherein the event-triggered switch transmits, via the communication network, the activation to the first and/or second resource pooling system to provide the risk protection to the risk exposed components.

2. The system according to claim 1, wherein the loss events are transferred to the second insurance system and the association of the single unique identifier is verified to be in compliance with the second reporting system of the second insurance system by the core engine.

3. The system according to claim 1, wherein the generation of the single unique identifier with associated aggregation parameter is also applied to loss events without linkage of other loss events to the same risk event.

4. The system according to claim 1, wherein the measurements of the parameters of two different loss events which are traceable to the same risk event based upon the measurement of related time parameters and related location parameters based upon the first filtering parameters and the risk-related component data indicating a biunique association to a single occurrence of a risk event, the corresponding link linking the two loss events is only created if the contributing risk transfer layers are within defined, covered segments, and wherein a segment is defined by the measured classification of geographic region and line of business.

5. The system according to claim 1, wherein the assigned single unique identifier is implemented as a discrete alphanumeric string identifying one or more loss events as a result of one specific risk event and being different from any policy numbers defining the risk transfer between the risk-exposed components and the first insurance system.

6. The system according to claim 1, wherein, in the event of a triggering of an occurrence of a risk event in the data flow pathway, corresponding loss events are assigned to the same single unique identifier.

7. The system according to claim 1, wherein the event-triggered switch is configured to capture a transfer of payment assigned to a defined risk transfer segment from the first insurance system at the second payment-transfer module, and wherein the assigned risk transfer segment is activated, and wherein the risk exposed of the first insurance system associated with the assigned risk transfer segment is transferred to the second insurance system.

8. The system according to claim 1, wherein a loss associated with the risk event and allocated to a pooled risk exposed component is distinctly covered by the resource pooling system of the first insurance system by a transfer of payments from the first resource pooling system to said risk exposed component, and wherein a second transfer of payment from the second resource pooling system to the first resource pooling system is triggered by the generated activation signal based upon the measured actual loss of the risk exposed component or a defined risk transfer function provided by an assembly module.

9. The system according to claim 1, wherein the loss corresponding to the risk that is transferred to the second resource pooling system is directly covered by the second resource pooling system by the transfer of resources from the second resource pooling system to the concerned risk exposed components by the second payment-transfer module.

10. The system according to claim 1, wherein an assembly module of the event-triggered switch is configured to process risk-related component data and provide a likelihood of risk exposure for one or a plurality of the pooled risk exposed components based upon risk-related component data, and wherein the receipt and preconditioned storage of payments from risk exposed components for the pooling of their risks is dynamically determined based upon total risk and the likelihood of the risk exposure of the pooled risk exposed components.

11. The system according to claim 10, wherein the assembly module of the event-triggered switch is configured to process risk-related component data and provide the likelihood of said risk exposure for one or a plurality of the pooled risk exposed components based upon risk-related component data, and wherein the receipt and preconditioned storage of payments from first resource pooling system to the second resource pooling system for the transfer of its risk is dynamically determined based upon total risk and the likelihood of the risk exposure of the pooled risk exposed components.

12. The system according to claim 11, wherein the number of pooled risk exposed components is dynamically adapted by the first resource pooling system to a range where non-covariant, and occurring risks covered by the resource pooling system affect only a relatively small proportion of the total pooled risk exposed components at any given time.

13. The system according to claim 1, wherein the pooled risk transfer from the first resource pooling system is dynamically adapted by the second resource pooling system to a range where non-covariant, occurring risks covered by the second resource pooling system affect only a relatively small proportion of the total pooled risk transfer from the first resource pooling system at any given time.

14. The system according to claim 1, wherein the risk event triggers are dynamically adapted by an operating module based upon time-correlated incidence data for one or a plurality of risk events.

15. The system according to claim 1, wherein, upon each triggering of an occurrence of measuring parameters indicating a risk event by at least one risk event trigger, a parametric payment is allocated with the triggering, wherein the total allocated payment is transferrable when the occurrence has been triggered.

16. The system according to claim 1, wherein the activation of the first or the second resource pooling system is based upon the adaptable risk transfer function directly providing threshold values for the complementary switching and activation of the first and the second resource pooling system, respectively.

17. A clash loss event triggered risk transfer method, for an event triggered risk transfer system, driven by occurrence of risk events by measuring and triggering by measuring devices and/or trigger modules measuring parameters in a data flow pathway of the measuring devices for optimized coupling and switching of two coupled automated systems, the measuring devices being associated with risk exposed components, a clash loss event being defined as a risk event causing losses at two or more of the risk exposed components by way of occurrence of a same risk event, the event triggered risk transfer method comprising:

connecting the risk exposed components to a first automated resource pooling system comprising electronic devices for automated risk-transfer of a first insurance system;

connecting the risk exposed components and the first insurance system;

receiving and storing payments from the risk exposed components for the pooling of their risks of loss in consequence of a hurricane or flood or fire or earthquake as defined risk events being measurable and triggerable by the measuring devices and trigger modules of the event triggered risk transfer system triggering in the data flow pathway of the measuring parameters;

connecting the first resource pooling system to a second automated resource pooling system comprising electronic devices for automated risk-transfer of a second insurance system;

receiving and storing payments from the first resource pooling system of the first insurance system for the transfer of risks of the pooled risks of the first insurance system to the second insurance system;

coupling, steering and operating the first resource pooling system and the second resource pooling system for covering losses associated with risks transferred to the first insurance system and the second insurance system by generating and transmitting, via a communication network, steering signals to the first and second resource pooling systems;

measuring, by measuring devices associated with the risk exposed components, risk-related component data of the occurrence of risk events; and transferring, upon occurrence, the measured risk-related component data of the measuring devices, to the first insurance system, wherein, based on filtering parameters of a filter, the risk-related component data are filtered for loss parameters of loss events as a consequence of the occurrence of one of the defined risk events;

wherein a core engine comprises event-driven triggers for triggering of the measuring devices associated with the risk exposed components for the occurrence of a risk event, the data flow pathway of the measuring devices being dynamically monitored by triggering the measuring parameters of the data flow pathway transmitted from associated measuring devices to detect the occurrence of risk events based upon predefined trigger parameters, wherein, using risk event triggers, the measured risk-related component data associated with different loss events are scanned for a pattern that traces measurements of two different loss events to the same risk event that is based at least upon time and location parameters indicating a biunique relation with a single occurrence of a risk event, wherein a risk event and associated loss events are only captured by entering a parametrized event into a first reporting system of the first system in response to the measured risk-related component data indicating occurrence of a sudden and accidental event directly interconnected in both time and location or indicating an originating cause, by related time parameters and related location parameters based upon the first filtering parameters, and wherein in the event of a match, a corresponding link is created, linking the two loss events, wherein the generation of a single unique identifier is triggered by triggering the linkage of two or more loss events to the occurrence of the same risk event, wherein each loss event linked to the occurrence of the same risk event is associated with the same single unique identifier, and wherein a single unique identifier is set by a unique discrete alphanumeric string, stored and associated with the corresponding loss event, wherein the loss events are transferred to the second insurance system providing a double check process and synchronization, wherein the loss events are entered into a second reporting system by the second insurance system upon separate recognition pursuant to defined parameterization of the clash loss event linked to the unique identifier, and wherein for each risk event, losses of linked loss events are aggregated by the core engine incrementing an aggregation parameter associated with each single unique identifier and captured by the second insurance system, the aggregation being triggered by the data of the first recording of the specific single unique identifier in the second reporting system of the second insurance system, wherein in the event of the detection of the aggregation parameter exceeding a predefined aggregate excess of loss threshold, an activation signal is generated by an event-triggered switch based on the aggregation parameter excess, wherein the event-triggered switch triggers the complementary activation of the first and second resource pooling systems using a generated activation signal by transmitting the activation to the first and/or second resource pooling system to provide risk protection to the risk exposed components, and wherein the activation of the first and/or second resource pooling system is based on a definable risk transfer structure including covered segments with scopes of covered risk lines and regions providing corresponding threshold values for the complementary switching and activation, wherein the definable risk transfer structure is generated by interpolating segment values as support points, the support points as segment values being structured by the risk transfer structure providing the activation signaling of the switching device linking the different segment values to each other, and wherein the event-triggered switch transmits, via the communication network, the activation to the first and/or second resource pooling system to provide the risk protection to the risk exposed components.

* * * * *